United States Patent
Wang et al.

(10) Patent No.: US 12,389,457 B2
(45) Date of Patent: Aug. 12, 2025

(54) WIRELESS NETWORKS WITHOUT UPLINK TRANSMIT POWER CONTROL

(71) Applicant: Apple Inc., Cupertino, CA (US)

(72) Inventors: Fucheng Wang, Cupertino, CA (US); Anatoliy S. Ioffe, Redwood City, CA (US)

(73) Assignee: Apple Inc, Cupertino, CA (US)

( * ) Notice: Subject to any disclaimer, the term of this patent is extended or adjusted under 35 U.S.C. 154(b) by 292 days.

(21) Appl. No.: 17/569,581

(22) Filed: Jan. 6, 2022

(65) Prior Publication Data

US 2022/0225418 A1    Jul. 14, 2022

Related U.S. Application Data

(60) Provisional application No. 63/137,588, filed on Jan. 14, 2021.

(51) Int. Cl.
  *H04W 74/0833*    (2024.01)
  *H04L 5/00*    (2006.01)
  *H04W 24/08*    (2009.01)

(52) U.S. Cl.
  CPC ....... *H04W 74/0833* (2013.01); *H04L 5/0048* (2013.01); *H04W 24/08* (2013.01)

(58) Field of Classification Search
  None
  See application file for complete search history.

(56) References Cited

U.S. PATENT DOCUMENTS 9,295,012 B2    3/2016   Kim et al.
10,980,035 B2   4/2021   Ioffe et al.
(Continued)

FOREIGN PATENT DOCUMENTS

CN    107124754 A    9/2017
CN    109151970 A    1/2019
(Continued)

OTHER PUBLICATIONS

Study on supporting NR from 52.6 GHz to 71 Ghz, 3GPP TSG RAN Meeting #88e RP-200902 Electronic Meeting, Jun. 29-Jul. 3, 2020, Intel Corporation.
(Continued)

*Primary Examiner* — Benjamin Lamont
(74) *Attorney, Agent, or Firm* — Treyz Law Group, P.C.; Michael H. Lyons

(57) ABSTRACT

A wireless network may include a base station and user equipment (UE). The UE and base station may perform initial access operations at frequencies greater than or equal to 57 GHz without the use of transmit power control (TPC) signals. The UE devices and the base station may also perform connected mode operations at these frequencies without the use of TPC signals. The UE may perform power saving operations without the use of TPC signals. The base station may handle communications for multiple UE devices in its cell by partitioning the UE into groups based on the estimated path loss for each UE. The base station may perform TDMA, OFDMA, or a combination of TDMA/OFDMA scheduling for the UE devices. Performing these communications without TPC signaling maximizes the amount of network resources available for other purposes, simplifies communication scheduling, and maximizes the efficiency of the network.

20 Claims, 13 Drawing Sheets

(56) References Cited

U.S. PATENT DOCUMENTS

| | | | |
|---|---|---|---|
| 2015/0181533 A1 | 6/2015 | Chen et al. | |
| 2015/0195015 A1 | 7/2015 | Kim et al. | |
| 2016/0165640 A1* | 6/2016 | Yang | H04W 72/12 |
| | | | 370/336 |
| 2016/0381644 A1* | 12/2016 | Forrester | H04W 4/025 |
| | | | 370/311 |
| 2020/0314764 A1 | 10/2020 | Noh et al. | |
| 2021/0385814 A1* | 12/2021 | Abotabl | H04W 72/23 |
| 2022/0086772 A1* | 3/2022 | Cozzo | H04W 52/281 |

FOREIGN PATENT DOCUMENTS

| | | |
|---|---|---|
| CN | 109600206 A | 4/2019 |
| CN | 110710281 A | 1/2020 |
| IN | 201627016507 A | 12/2014 |
| WO | 2013042980 A2 | 3/2013 |

OTHER PUBLICATIONS

Extending current NR operation to 71GHz, 3GPP TSG RAN Meeting #90-e RP-202925 Electronic Meeting, Dec. 7-11, 2020, CMCC.

3rd Generation Partnership Project; Technical Specification Group Radio Access Network; NR; User Equipment (UE) radio transmission and reception; Part 2: Range 2 Standalone (Release 17), 3GPP TS 38.101-2, Dec. 2020, vol. 17, 3GPP, Valbonne, France.

Jacob John, Draft Report from the RAN WG5#87-e Meeting, May 17-28, 2020, pp. 1-521, V 1.0, A Global Initiative.

UL Power control in dual connectivity, 3GPP TSG RAN WG1 Meeting #76, Mar. 31-Apr. 4, 2014, pp. 1-5, Shenzhen, China.

* cited by examiner

WIRELESS NETWORKS WITHOUT UPLINK TRANSMIT POWER CONTROL

This application claims the benefit of U.S. Provisional Patent Application No. 63/137,588, filed Jan. 14, 2021, which is hereby incorporated by reference herein in its entirety.

FIELD

This disclosure relates generally to wireless networks and, more particularly, to wireless networks having electronic devices with wireless communications circuitry.

BACKGROUND

Electronic devices often include wireless communications circuitry. For example, cellular telephones, computers, and other devices often contain antennas and wireless transceivers for supporting wireless communications. The electronic devices communicate with wireless base stations in a wireless network.

Each wireless base station operates within a corresponding cell. It can be difficult to provide satisfactory and efficient wireless communications for one or more electronic devices within the cell, especially at relatively high frequencies such as millimeter wave frequencies.

SUMMARY

A wireless network may include a base station having a corresponding cell. User equipment (UE) devices may be located within the cell and may communicate with the base station. The UE devices and the base station may perform initial access operations at frequencies greater than or equal to 57 GHz without the use of transmit power control (TPC) signals. The UE devices and the base station may also perform connected mode operations at frequencies greater than or equal to 57 GHz without the use of TPC signals.

If desired, the UE devices may perform power saving operations without the use of TPC signals. The power saving operations may be performed using non-TPC downlink (DL) signals transmitted by the base station or may be performed by the UE devices independently from the network. Performing these communications without TPC commands may maximize the amount of network resources available for other purposes, may simplify communication scheduling, and may maximize the efficiency of the network.

The base station may handle communications for multiple UE devices in its cell. The base station may estimate path losses for each of the UE devices and may partition the UE devices into different groups based on the estimated path losses. The base station may generate communication schedules for each of the UE devices based on the group assignments. The base station may allocate timing for the UE devices based on a time-domain multiple access (TDMA) scheme, an orthogonal frequency-domain multiple access (OFDMA) scheme, or a combined TDMA/OFDMA scheme. The base station may use the communication schedule to perform subsequent communications with the UE devices. During these subsequent communications, each UE device may transmit uplink (UL) signals at its maximum output power level (unless the power saving operations are performed), without the use of TPC signaling.

An aspect of the disclosure provides an electronic device configured to communicate with a wireless base station. The electronic device can include a phased antenna array. The electronic device can include a 5G new radio (NR) transceiver. The 5G NR transceiver can be configured to use the phased antenna array to transmit first uplink (UL) signals to the wireless base station at a maximum output power level of the 5G NR transceiver during an initial access operation. The 5G NR transceiver can be configured to use the phased antenna array to transmit second UL signals to the wireless base station at the maximum output power level during a connected mode operation. The first and second UL signals can be at frequencies greater than or equal to 57 GHz.

An aspect of the disclosure provides a method of operating user equipment to communicate with a wireless base station. The method can include, with wireless communications circuitry on the user equipment, transmitting first uplink (UL) signals to the wireless base station at a maximum output power level of the wireless communications circuitry. The first UL signals can include physical random access channel (PRACH) signals. The method can include, with the wireless communications circuitry, transmitting second UL signals to the wireless base station at the maximum output power level subsequent to transmission of the PRACH signals. The first and second UL signals can be transmitted at frequencies greater than or equal to 57 GHz.

An aspect of the disclosure provides a method of operating a wireless base station within a cell. The method can include performing a physical random access channel (PRACH) process with a user equipment (UE) device in the cell at frequencies greater than 57 GHz. The UE device can transmit uplink (UL) PRACH signals at its maximum output power level during the PRACH process. The method can include performing connected mode communications with the UE device at frequencies greater than 57 GHz subsequent to the PRACH process. The UE device can transmit UL signals at the maximum output power level during the connected mode communications.

An aspect of the disclosure provides a method of operating a wireless base station within a cell. The method can include transmitting a downlink (DL) reference signal (RS) to user equipment (UE) devices in the cell. Each of the UE devices can have a respective maximum output power level and the DL RS can instruct each of the UE devices to transmit a respective uplink (UL) RS at its respective maximum output power level. The method can include receiving the UL reference signals and measuring power levels of the received UL reference signals. The method can include generating a respective path loss value for each of the UE devices based on the measured power levels of the received UL reference signals. The method can include partitioning the UE devices into groups based on the path loss values. The method can include generating communication schedules for the UE devices based at least in part on the group to which each UE device is partitioned. The method can include performing communications at frequencies greater than or equal to 57 GHz with the UE devices based on the generated communication schedules.

DETAILED DESCRIPTION

Figure 1:
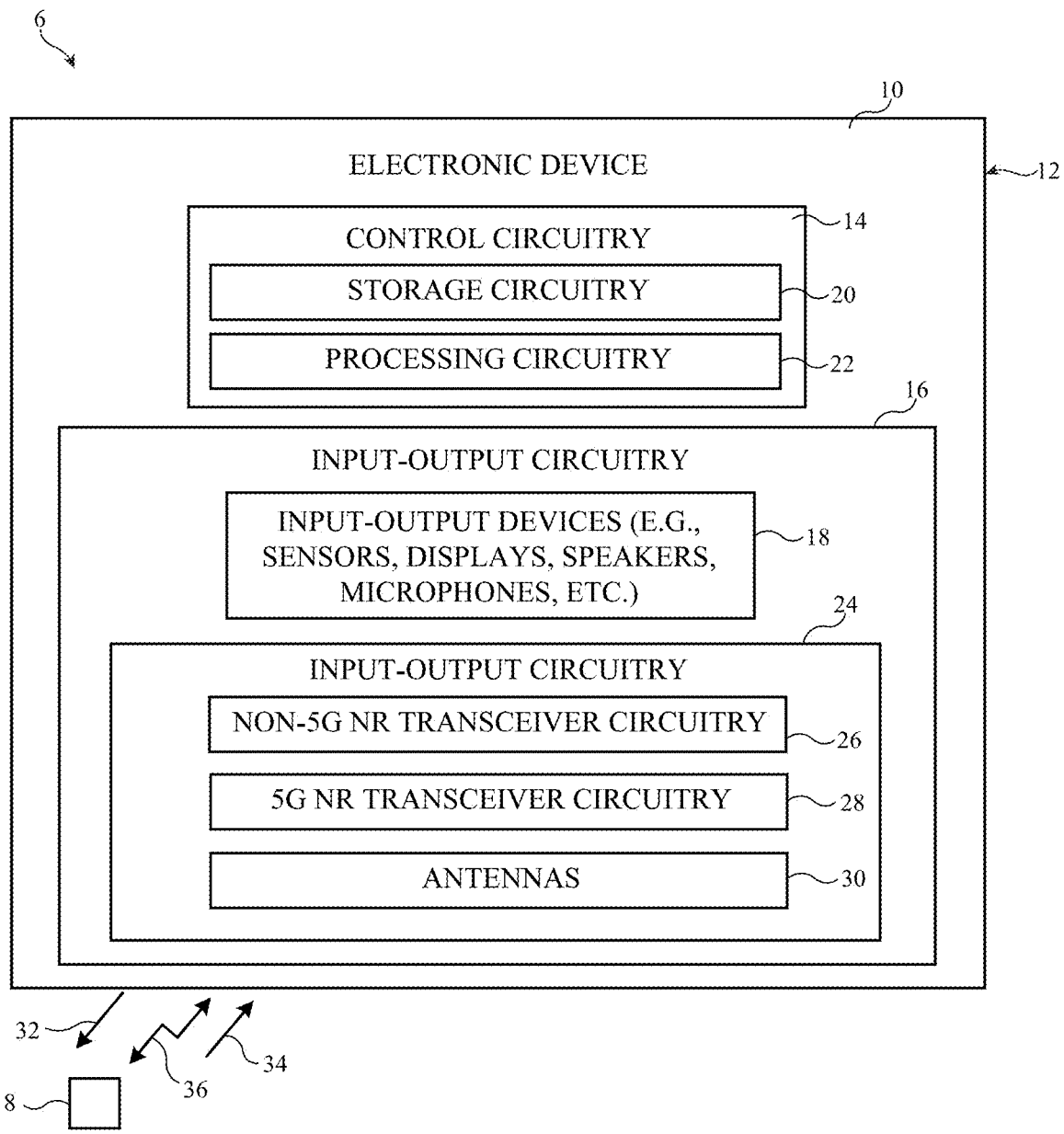
FIG. 1 is a functional block diagram of an illustrative electronic device having wireless circuitry for communicating with a wireless base station in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 20 may include storage that is integrated within device 10 and/or removable storage media.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices 18 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 18 may be peripherals that are coupled to a main processing unit or other portion of device 10 via a wired or wireless link).

Input-output circuitry 16 may include wireless circuitry 24 to support wireless communications. Wireless circuitry 24 (sometimes referred to herein as wireless communications circuitry 24) may include one or more antennas 30. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 30. While control circuitry 14 is shown separately from wireless circuitry 24 in the example of FIG. 1 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Radio-frequency signals may be conveyed by wireless circuitry 24 using 5G New Radio (5G NR) communications bands or any other desired communications bands (sometimes referred to herein as frequency bands or simply as bands). The radio-frequency signals may include millimeter wave signals, sometimes referred to as extremely high frequency (EHF) signals, which propagate at frequencies above about 30 GHz (e.g., at 60 GHz or other frequencies between about 30 GHz and 300 GHz). The radio-frequency signals may also additionally or alternatively include centimeter wave signals, which propagate at frequencies between about 10 GHz and 30 GHz. The radio-frequency signals may additionally or alternatively include signals at frequencies less than 10 GHz, such as signals between about 410 MHz and 7125 MHz. In scenarios where the radio-frequency signals are conveyed using 5G NR communications bands, the radio-frequency signals may be conveyed in 5G NR communications bands within 5G NR Frequency Range 2 (FR2), which includes centimeter and millimeter wave frequencies between about 24 GHz and 100 GHz, 5G NR communications bands within 5G NR Frequency Range 1 (FR1), which includes frequencies below 7125 MHz, and/or other 5G NR communications bands within other 5G NR frequency ranges FRx (e.g., where x is an integer greater than 2), which may include frequencies above around 57-60 GHz. If desired, device 10 may also contain antennas for handling satellite navigation system signals, cellular telephone signals (e.g., radio-frequency signals conveyed using long term evolution (LTE) communications bands or other non-5G NR communications bands), wireless local area network signals, near-field communications, light-based wireless communications, or other wireless communications.

For example, as shown in FIG. 1, wireless circuitry 24 may include radio-frequency transceiver circuitry that is used in conveying radio-frequency signals using the 5G NR communications protocol and RAT such as 5G NR transceiver circuitry 28. 5G NR transceiver circuitry 28 may support communications at frequencies between about 24 GHz and 100 GHz (e.g., within FR2, FRx, etc.) and/or at frequencies between about 410 MHz and 7125 MHz (e.g., within FR1). Examples of frequency bands that may be covered by 5G NR transceiver circuitry 28 include communications bands under the family of 3GPP wireless communications standards, communications bands under the IEEE 802.XX family of standards, an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, and/or other frequency bands between approximately 10 GHz and 110 GHz, a C-band between about 3300 MHz and 5000 MHz, an S-band between about 2300 MHz and 2400 MHz, an L-band between about 1432 MHz and 1517 MHz, and/or other frequency bands between approximately 410 MHz and 7125 MHz. 5G NR transceiver circuitry 28 may be formed from one or more integrated circuits (e.g., multiple integrated circuits mounted on a common printed circuit in a system-in-package device, one or more integrated circuits mounted on different substrates, etc.). Wireless circuitry 24 may cover different frequency bands that are used in different geographic regions if desired.

Wireless communications using 5G NR transceiver circuitry 28 may be bidirectional. For example, 5G NR transceiver circuitry 28 may convey radio-frequency signals 36 to and from external wireless equipment such as external equipment 8. External equipment 8 may be another electronic device such as electronic device 10, may be a wireless access point, may be a wireless base station, etc. Implementations in which external equipment 8 is a wireless base station are sometimes described herein as an example. External equipment 8 may therefore sometimes be referred to herein as wireless base station 8 or simply as base station 8. Base station 8 may have control circuitry such as control circuitry 14 and wireless circuitry such as wireless circuitry 24 of device 10.

Device 10 and base station 8 may form part (e.g., nodes and/or terminals) of a wireless communications network such as communications network 6. Communications network 6 (sometimes referred to herein as network 6) may include any desired number of devices 10, base stations 8, and/or other network components (e.g., switches, routers, access points, servers, end hosts, local area networks, wireless local area networks, etc.) arranged in any desired network configuration. Network 6 may be managed by a wireless network service provider. Device 10 may also sometimes be referred to herein as user equipment (UE) 10 or UE device 10 (e.g., because device 10 may be used by an end user to perform wireless communications with the network). Base station 8 may operate within a corresponding cell that spans a particular geographic location or region. Base station 8 may be used to provide communications capabilities for multiple UE devices such as device 10 that are located within its cell.

Radio-frequency signals 36 (sometimes referred to herein as wireless link 36) may include radio-frequency signals transmitted by device 10 to base station 8 (e.g., in uplink direction 32) and radio-frequency signals transmitted by base station 8 to device 10 (e.g., in downlink direction 34). The radio-frequency signals 36 conveyed in uplink direction 32 may sometimes be referred to herein as uplink (UL) signals. The radio-frequency signals in downlink direction 34 may sometimes be referred to herein as downlink (DL) signals. Radio-frequency signals 36 may be used to convey wireless data. The wireless data may include a stream of data arranged into data packets, symbols, frames, etc. The wireless data may be organized/formatted according to the communications protocol governing the wireless link between device 10 and base station 8 (e.g., a 5G NR communications protocol). Wireless data conveyed by the uplink signals transmitted by device 10 (e.g., in uplink direction 32) may sometimes be referred to herein as uplink data. Wireless data conveyed by the downlink signals transmitted by base station 8 in (e.g., in downlink direction 34) may sometimes be referred to herein as downlink data. The wireless data may, for example, include data that has been encoded into corresponding data packets such as wireless data associated with a telephone call, streaming media content, internet browsing, wireless data associated with software applications running on device 10, email messages, etc. Control signals may also be conveyed in the uplink and/or downlink direction between base station 8 and device 10.

If desired, wireless circuitry 24 may also include transceiver circuitry for handling communications in non-5G NR communications bands such as non-5G NR transceiver circuitry 26. Non-5G NR transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz (e.g., cellular telephone signals conveyed using a 4G LTE protocol, a 3G protocol, or other non-5G NR protocols), GPS receiver circuitry that receives GPS signals at 1575 MHz or signals for handling other satellite positioning data (e.g., GLONASS signals at 1609 MHz, BeiDou Navigation Satellite System (BDS) band signals, etc.), television receiver circuitry, AM/FM radio receiver circuitry, paging system transceiver circuitry, near field communications (NFC) circuitry, ultra-wideband (UWB) transceiver circuitry that operates under the IEEE 802.15.4 protocol and/or other ultra-wideband communications protocols, etc. Non-5G NR transceiver circuitry 26 and 5G NR transceiver circuitry 28 may each include one or more integrated circuits, power amplifier circuitry, low-noise input amplifiers, passive radio-frequency components, switching circuitry, transmission line structures, and other circuitry for handling radio-frequency signals. Non-5G NR transceiver circuitry 26 may transmit and receive radio-frequency signals below 10 GHz (and organized according to a non-5G NR communications protocol) using one or more antennas 30. 5G NR transceiver circuitry 28 may transmit and receive radio-frequency signals (e.g., at FR1 and/or FR2/FRx frequencies including frequencies above 57 GHz) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. 5G NR transceiver circuitry 28 may convey radio-frequency signals over short distances that travel over a line-of-sight path. To enhance signal reception for 5G NR communications, and particularly for communications at frequencies greater than 10 GHz, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming non-5G NR wireless links for non-5G NR transceiver circuitry 26 and another type of antenna may be used in conveying radio-frequency signals in 5G NR communications bands for 5G NR transceiver circuitry 28. If desired, antennas 30 that are used to convey radio-frequency signals for 5G NR transceiver circuitry 28 may be arranged in one or more phased antenna arrays.

Figure 2:
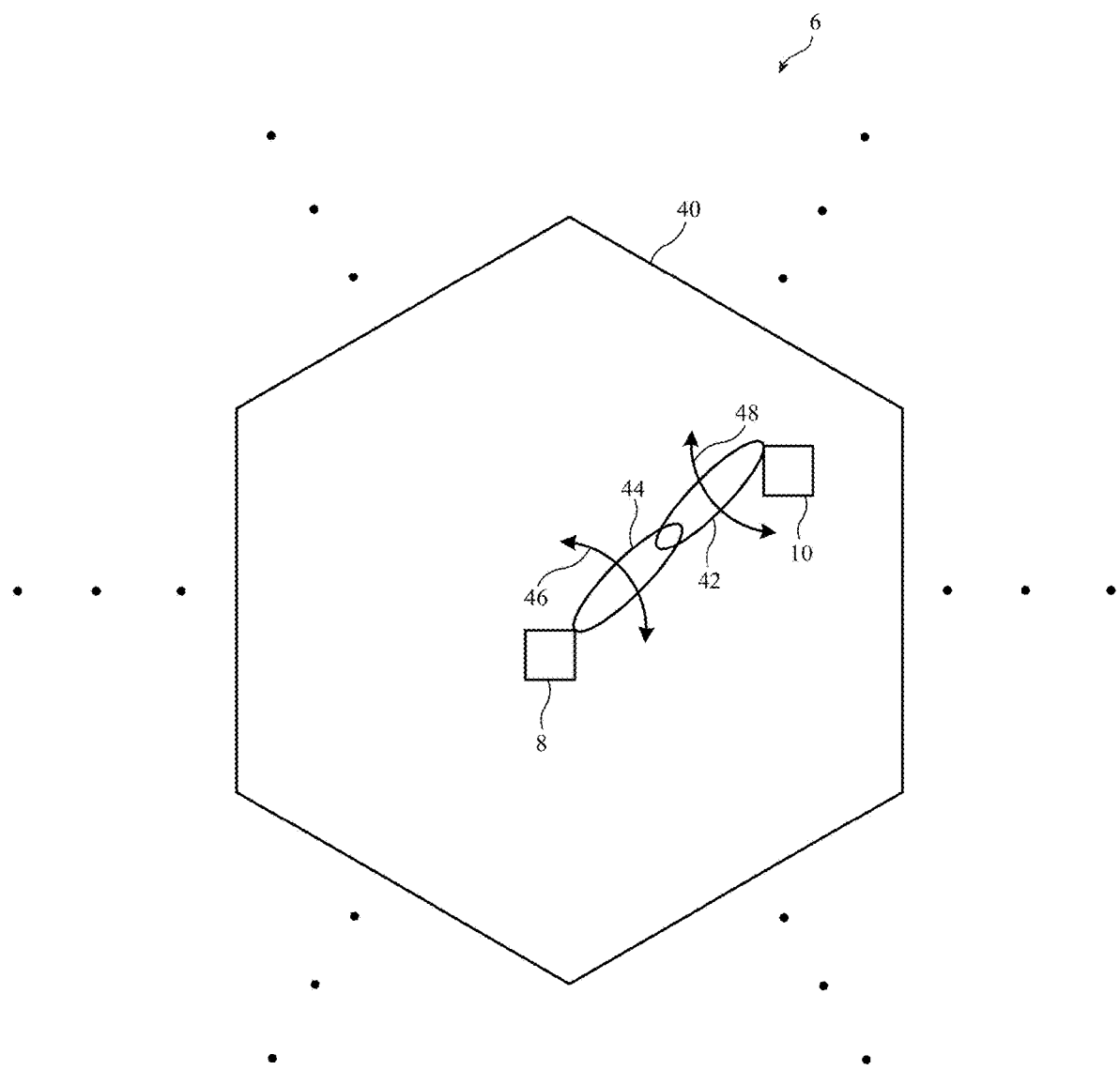
FIG. 2 is a diagram of an illustrative cell having a wireless base station and user equipment that communicate using steerable beams of radio-frequency signals in accordance with some embodiments.

FIG. 2 is a diagram showing how base station 8 may communicate with device 10 within a corresponding cell of network 6. As shown in FIG. 2, network 6 may be organized into one or more cells such as cell 40 distributed across one or more geographic areas or regions. Cell 40 may have any desired shape. Base station 8 may communicate with one or more UE devices within cell 40 such as device 10 (e.g., to provide communications access for device 10 to the rest of network 6, other UE devices, other networks, the Internet, etc.). While the storage and processing operations of base station 8 may sometimes be described herein as being performed by or at base station 8, some or all of the control circuitry for base station 8 (e.g., storage circuitry such as storage circuitry 20 and/or processing circuitry such as processing circuitry 22) may be located at base station 8 and/or may be distributed across two or more network devices in network 6 (e.g., any desired number of base stations, servers, cloud networks, physical devices, distributed and/or virtual/logical devices implemented via software, etc.).

When operating at relatively high frequencies such as frequencies greater than 10 GHz, the radio-frequency signals conveyed between base station 8 and device 10 may be subject to substantial over-the-air signal attenuation. In order to increase the gain of these signals, base station 8 and/or device 10 may convey the radio-frequency signals using phased antenna arrays (e.g., phased arrays of antennas 30). Each antenna in the phased antenna array may convey radio-frequency signals that are provided with a respective phase and magnitude. The signals conveyed by each antenna constructively and destructively interfere to produce a corresponding signal beam having a pointing direction (e.g., the direction of the signal beam having peak gain). The phases and/or magnitudes provided to each antenna may be adjusted to actively steer the signal beam in different directions.

For example, as shown in FIG. 2, device 10 may use a phased antenna array to convey radio-frequency signals (e.g., radio-frequency signals 36 of FIG. 1) over signal beam 42. Device 10 may adjust the phases/magnitudes provided to each antenna in the phased antenna array to point signal beam 42 in a selected pointing direction, as shown by arrow 48. Similarly, base station 8 may use a phased antenna array to convey radio-frequency signals over signal beam 44. Base station 8 may adjust the phases/magnitudes provided to each antenna in the phased antenna array to steer signal beam 44 to point in a selected pointing direction, as shown by arrow 46. Base station 8 may steer signal beam 44 to point towards device 10 and device 10 may steer signal beam 42 to point towards base station 8 to allow wireless data to be conveyed between base station 8 and device 10. Phased antenna arrays may also sometimes be referred to as phased array antennas (e.g., phased arrays of antenna elements). The signal beam directions may be adjusted over time as device 10 moves relative to base station 8. Handover operations may be performed with other base stations in network 6 as device 10 moves between cells 40.

Device 10 may transmit uplink signals to base station 8 within signal beam 42. Device 10 may transmit the uplink signals at a selected output power level (sometimes referred to herein as an uplink output power level, transmission power level, or transmit power level). Device 10 may have a maximum output power level $P_{CMAX}$ (e.g., the maximum output power level with which device 10 can transmit radio-frequency signals within signal beam 42). The output power level may be adjusted using an uplink (UL) power control operation. In cellular networks, UL power control can be a complicated process that includes an open loop power control operation during initial access (e.g., during a physical random access channel (PRACH) process), followed by a closed loop power control operation when the UE device is in connection with the network (e.g., when the UE and the base station convey physical uplink shared channel (PUSCH) signals, physical uplink control channel (PUCCH) signals, sounding reference signals (SRS), etc.).

As an example, during the initial access operation (e.g., during the PRACH process), the UE can determine its output power level as the lesser of $P_{CMAX}$ and a power level equal to a target power level desired for the signals as received at the base station plus the path loss PL associated with propagation of the signals between the base station and the UE. In general, greater distances between the UE and the base station involve greater path loss PL than shorter distances between the UE and the base station. The UE determines its output power level during the initial access operation without being instructed to adjust its output power level by a TPC command transmitted by the base station. Similarly, during the closed loop power control operation, the output power level of the UE is selected to be the lesser of $P_{CMAX}$ and a power level that accounts for the target power level at the base station, path loss PL, bandwidth factors, and other fine-tuning adjustment factors. During the closed loop power control operation, TPC commands are typically conveyed between the base station and the UE to iteratively adjust the output power level of the UE in a fine-tuning process over time (e.g., the network may measure the power level of the UL signals transmitted by the UE, compare the measured power level to a desired power level, and instruct the UE to adjust its output power level accordingly). In other words, during both the initial access operation and during connection, an output power level is selected for or by the UE and, if the selected output power level exceeds $P_{CMAX}$, the UE will transmit at $P_{CMAX}$.

It can therefore be seen that the two key parameters in determining the output power level of device 10 are maximum output power level $P_{CMAX}$ and path loss PL. For high frequencies such as frequencies greater than or equal to 57 GHz, the maximum output power level $P_{CMAX}$ of device 10 generally decreases with increasing frequency, while the path loss increases with increasing frequency. On the other hand, to take advantage of the wider channel bandwidth (CBW) available at higher frequencies, the output power level of device 10 needs to be higher (e.g., scaled with the transmission bandwidth) to maintain a sufficiently high signal-to-noise ratio (SNR) at base station 8. As a result, device 10 may always use output power level $P_{CMAX}$ in communicating with base station 8. This implies that TPC commands need not be conveyed between base station 8 and device 10.

The amount of network resources available for communications between base station 8 and device 10 is finite. Being able to communicate between device 10 and base station 8 without transmission of TPC commands may therefore maximize the amount of network resources available for other purposes, as well as the efficiency of the network. In general, TPC commands are used to ensure that the user equipment does not transmit more output power than needed or less than a required output power.

For example, TPC commands are often used to minimize co-channel interference for both intra-cell and inter-cell scenarios (e.g., interference within the same frequency channel within a single cell 40 or between adjacent cells 40). However, at relatively high frequencies such as FR2 frequencies or frequencies greater than or equal to 57 GHz, inter-cell co-channel interference is not a significant concern because the UE transmits signals within a signal beam having relatively high directivity (see, e.g., signal beam 42 of FIG. 2). While the signal beam may also exhibit side lobes (signal beam 42 of FIG. 2 only shows the primary or main lobe of the signal beam 42), the side lobe power is much weaker than the main lobe power, such that inter-cell interference from the side lobes is generally not a factor.

TPC commands are also often used to avoid saturating the receiver at base station 8 (sometimes referred to as gNB 8). For example, TPC commands can be transmitted to the UE to instruct the UE to reduce its output power level such that the signals transmitted by the UE do not saturate the receiver at base station 8. However, at relatively high frequencies such as FR2 frequencies or frequencies greater than or equal to 57 GHz, it is unlikely that the receiver at base station 8 would be saturated by the uplink signals due to the limited maximum output power level capability of the UE (e.g., $P_{CMAX}$) and the high path loss PL at these frequencies, even over relatively short distances such as 1 meter or less.

In addition, TPC commands are used to maintain a desired SNR for the UL signals as received at base station 8. For example, TPC commands can be transmitted to device 10 to instruct device 10 to increase its output power level until the SNR measured at base station 8 exceeds a predetermined minimum SNR threshold level. However, as described above, the maximum output power level $P_{CMAX}$ of device 10 generally decreases with increasing frequency, path loss PL increases with increasing frequency, and the output power level of the UE needs to be scaled (directly) proportionally with the transmission bandwidth to maintain a sufficiently high SNR at base station 8. As a result, the UE (e.g., device 10) may always use output power level $P_{CMAX}$, and the TPC commands are therefore not needed at high frequencies such as frequencies in FR2 or frequencies greater than or equal to 57 GHz.

Figure 3:
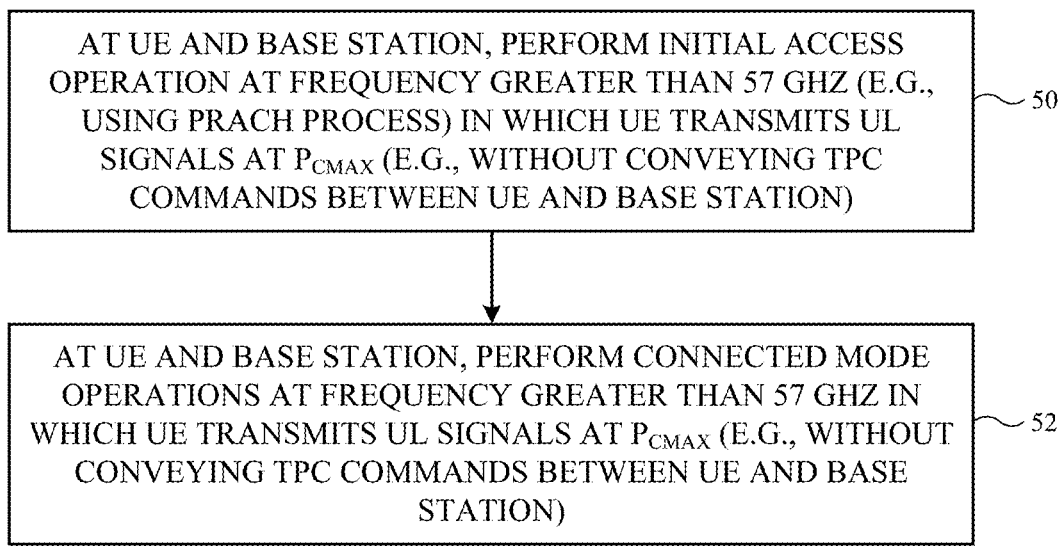
FIG. 3 is a flow chart of illustrative operations that may be performed by a wireless base station and user equipment to communicate without conveying transmit power control (TPC) signals in accordance with some embodiments.

FIG. 3 is a flow chart of operations that may be performed by base station 8 and device 10 to communicate without using TPC commands (e.g., under a 5G NR communications protocol). At operation 50, device 10 and base station 8 may perform initial access operations at a relatively high frequency such as a frequency greater than or equal to 57 GHz. The initial access operations may, for example, be performed using a PRACH process in which PRACH requests and PRACH responses are conveyed between device 10 and base station 8 over a PRACH channel. During these initial access operations, device 10 may transmit UL signals to base station 8 at its maximum output power level $P_{CMAX}$. The initial access operations (e.g., the PRACH process) may be performed without conveying or transmitting TPC signals such as TPC commands between base station 8 and device 10.

After the initial access operations, base station 8 and device 10 enter a connected mode (at operation 52). Device 10 and base station 8 may perform connected mode operations in which base station 8 transmits DL signals specifically to device 10 and device 10 transmits UL signals to base station 8. The UL signals may include PUSCH signals, PUCCH signals, SRS signals, and/or other UL signals, as examples. The DL signals may include physical downlink shared channel (PDSCH), physical downlink control channel (PDCCH), SRS signals, and/or other DL signals, as examples. During the connected mode operations, device 10 may transmit UL signals (e.g., PUSCH signals, PUCCH signals, SRS signals, etc.) at its maximum output power level $P_{CMAX}$. These UL and DL signals may be conveyed between device 10 and base station 8 without conveying or transmitting TPC signals (e.g., TPC commands) between base station 8 and device 10 (e.g., device 10 and base station 8 may perform communications in the connected mode without conveying TPC signals).

In this way, the UL signals may be received at base station 8 with satisfactory SNR despite the substantial path loss associated with high frequencies such as frequencies greater than or equal to 57 GHz. Performing these communications without TPC commands may maximize the amount of network resources available for other purposes, may simplify communication scheduling, and may maximize the efficiency of the network, as examples. The 5G NR communications protocol used by base station 8 and device 10 may define that device 10 is to transmit the UL signals only at maximum output power level $P_{CMAX}$ during operations 50 and 52 and/or base station 8 may instruct device 10 to only transmit UL signals at maximum output power level $P_{CMAX}$ during operations 50 and 52 (e.g., using DL control signals, scheduling, etc.), as examples.

Figure 4:
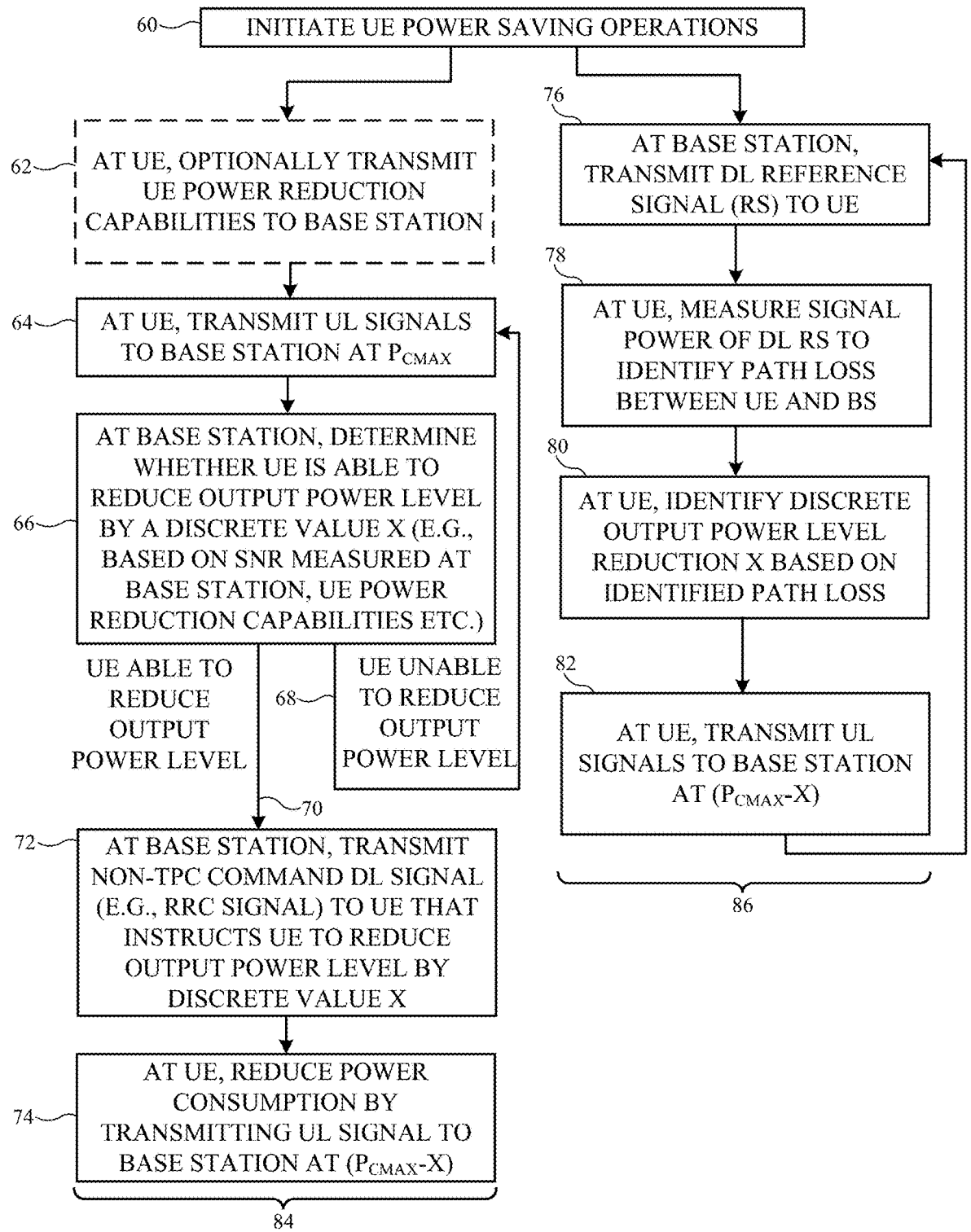
FIG. 4 is a flow chart of illustrative operations that may be performed by a wireless base station and/or user equipment to reduce user equipment power consumption while communicating without conveying TPC signals in accordance with some embodiments.

TPC signals are often used to reduce UE power consumption by avoiding transmission of more output power than needed for satisfactory communications. If desired, device 10 may be perform power savings operations (e.g., in a power saving mode) without the use of TPC signals. FIG. 4 is a flow chart of operations that may be performed by base station 8 and/or device 10 to reduce power consumption at device 10 without the use of TPC signals.

At operation 60, power savings operations may begin. The power savings operations may begin while performing operation 52 and/or operation 50 of FIG. 3. The power savings operations may be performed continuously, periodically, in response to a trigger condition, etc. The power savings operations may be performed at the instruction of the network (e.g., while performing operations 84) and/or by device 10 independently of the network (e.g., while performing operations 86).

When performing power savings operations at the instruction of the network (operations 84), processing may proceed to optional operation 62. At operation 62, device 10 may transmit UL signals that identify the power reduction capability of device 10 to base station 8. Base station 8 may determine the power reduction capability of device 10 based on the transmitted UL signals. The power reduction capability may, for example, identify that device 10 is capable of performing communications at output power levels below $P_{CMAX}$, one or more output power levels less than $P_{CMAX}$ that can be used, and/or any other desired output power level capabilities for device 10.

At operation 64, device 10 may transmit UL signals to base station 8 at maximum output power level $P_{CMAX}$. The UL signals may include PRACH signals (e.g., during operation 50 of FIG. 3), PUSCH/PUCCH/SRS signals (e.g., during operation 52 of FIG. 3), and/or any other desired uplink signals.

At operation 66, base station 8 may receive the transmitted UL signals. Base station 88 may measure the SNR of the UL signals and/or any other desired wireless performance metric values characterizing the wireless performance of the UL signals (e.g., received signal strength, error rates, noise floor, etc.). Base station 8 may determine whether device 10 is able to reduce its output power level from $P_{CMAX}$ based on the measured SNR and/or the other wireless performance metric values. For example, if the measured SNR exceeds a predetermined minimum SNR threshold value (e.g., a minimum SNR value at which base station 8 is still able to satisfactorily decode the received UL signals) by at least a predetermined margin, base station 8 may determine that device 10 can reduce its output power level below $P_{CMAX}$ without sacrificing the ability of base station 8 to correctly receive and decode the UL signals. Base station 8 may also identify one or more discrete values X (e.g., in dB) by which device 10 can decrease its output power level below $P_{CMAX}$ while still producing an SNR that exceeds the minimum SNR threshold value. Other threshold values may be used for this comparison in scenarios where other wireless performance metrics are used. If desired, base station 8 may also use the power reduction capabilities as identified at operation 62 in determining whether device 10 is able to reduce its output power level from $P_{CMAX}$ (e.g., processing may end after operation 62 in scenarios where device 10 does not have any power reduction capabilities, if discrete value X is not consistent with the power reduction capabilities, etc.).

If base station 8 determines that device 10 is unable to reduce its output power level below $P_{CMAX}$ (e.g., without producing SNR values at base station 8 that are below the minimum SNR threshold value), processing may loop back to step 64 via path 68 and device 10 may continue to transmit UL signals at maximum output power level $P_{CMAX}$. If base station 88 determines that device 10 is able to reduce its output power level below $P_{CMAX}$ (e.g., by one or more discrete values X while still producing SNR values at base station 8 that exceed the minimum SNR threshold value), processing may proceed to operation 72 via path 70.

At operation 72, base station 8 may transmit a non-TPC DL signal to device 10 that instructs device 10 to reduce its output power level below $P_{CMAX}$ by one or more discrete values X. The non-TPC DL signal may include any desired DL signals that are not used as a part of the TPC process (e.g., any desired non-TPC command). As one example, the non-TPC DL signal may be a radio resource control (RRC) signal conveyed over an RRC channel.

At operation 74, device 10 may receive the non-TPC DL signal from base station 8 and may decrease its output power level below $P_{CMAX}$ by the one or more discrete values X identified by the non-TPC DL signals (e.g., device 10 may transmit UL signals at an output power level equal to $P_{CMAX}-X$). Device 10 may use this reduced output power level to transmit subsequent UL signals without causing base station 8 to produce SNR values that fall below the minimum SNR value threshold. Device 10 may continue to use this reduced output power level for a predetermined period, until subsequent instructions are received from base station 8, until the SNR values gathered at base station 8 fall below the minimum SNR value threshold, or until any other desired trigger condition is met. In this way, device 10 may reduce its output power level and thus its power consumption, thereby maximizing battery life, while still performing satisfactory radio-frequency communications with base station 8 without the use of TPC commands.

When performing power savings operations independent of instructions from the network (operations 86), processing may proceed from operation 60 to operation 76. At operation 76, base station 8 may transmit a DL reference signal (RS) to device 10.

At operation 78, device 10 may receive the DL RS and may measure the signal power of the received DL RS. Device 10 may use the measured signal power and the nominal transmit power of the DL RS (e.g., as identified in the DL RS when generated by the base station) to estimate or identify the path loss PL between device 10 and base station 8. For example, if the measured signal power is significantly less than the nominal transmit power level, this may be indicative of a relatively high path loss PL between device 10 and base station 8 (e.g., a path loss consistent with device 10 being relatively far from base station 8). Conversely, if the measured signal power is closer to the transmit power level, this may be indicative of a relatively low path loss PL between device 10 and base station 8 (e.g., a path loss consistent with device 10 being relatively close to base station 8).

At operation 80, device 10 may process the estimated path loss to identify one or more discrete output power level reductions below $P_{CMAX}$ (e.g., discrete values X) that device 10 can make while still allowing for satisfactory radio-frequency communications with base station 8. For example, since device 10 has knowledge of its own output power level, device 10 may use the estimated path loss PL to identify or estimate the power level of the UL signals as received at base station 8. Once device 10 has estimated the power level of the UL signals as received at base station 8, device 10 may determine how much it can decrease its output power level without causing the SNR at base station 8 to fall below the minimum SNR value threshold.

At operation 82, device 10 may transmit subsequent UL signals at a reduced output power level that is less than $P_{CMAX}$ (e.g., at an output power level of $P_{CMAX}-X$). Device 10 may transmit these UL signals without causing base station 8 to produce SNR values that fall below the minimum SNR value threshold. If desired, processing may loop back to operation 76 via path 87 so device 10 can update its own output power level as necessary over time. Device 10 may continue to use the reduced output power level for a predetermined period, until subsequent instructions are received from base station 8, until the estimated path loss PL exceeds a predetermined maximum path loss threshold value, or until any other desired trigger condition is met. By performing open loop output power level adjustments in this way (operations 86), device 10 may reduce its output power level and thus its power consumption in a manner transparent to the network, thereby maximizing battery life, while still performing satisfactory radio-frequency communications with base station 8 without the use of TPC commands. One, both, or neither of operations 86 and 84 may be performed by device 10 and base station 8 while performing the operations of FIG. 3.

Figure 5:
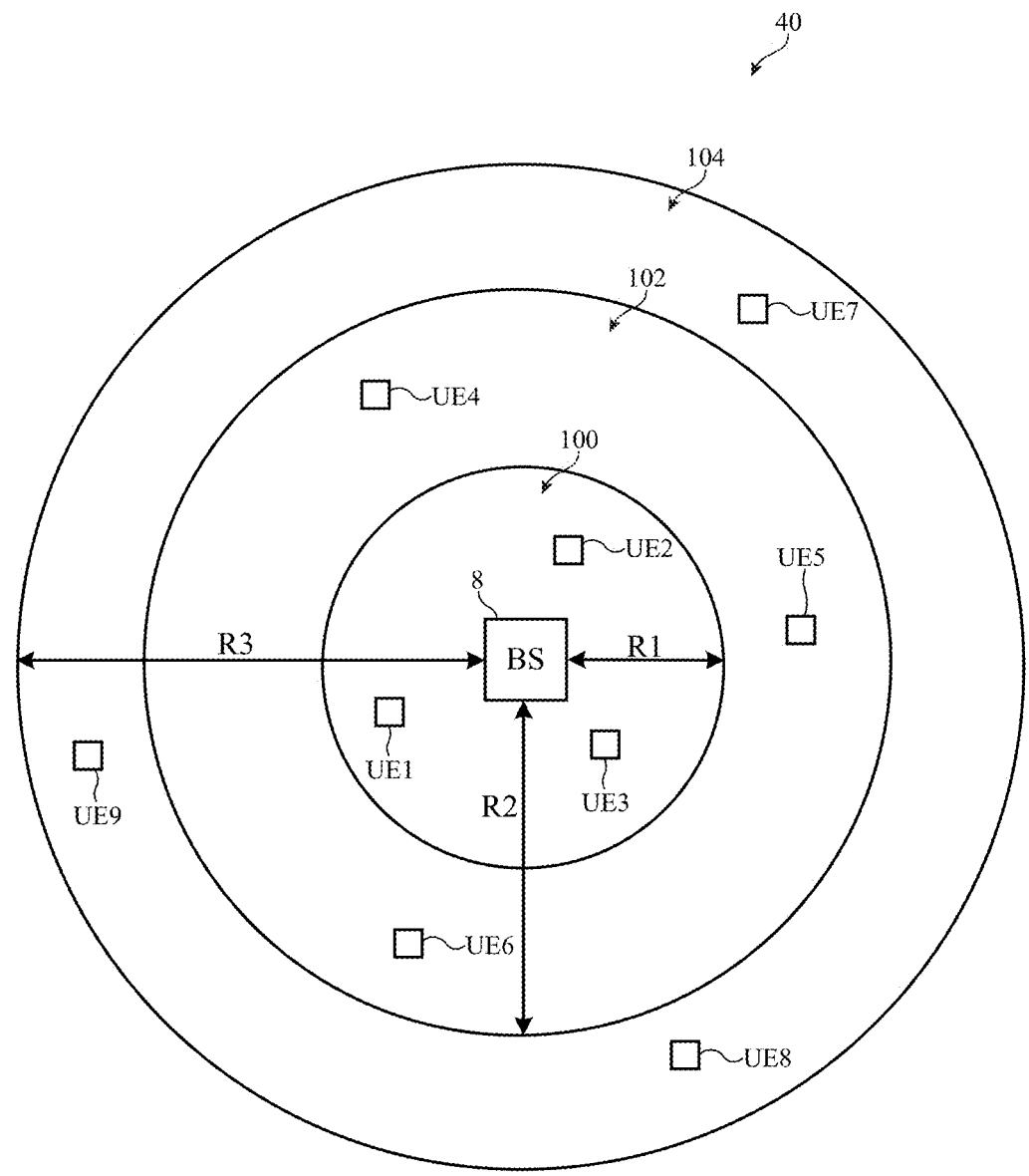
FIG. 5 is a diagram of an illustrative cell in which a base station communicates with multiple user equipment devices without conveying TPC signals in accordance with some embodiments.

In practice, base station 8 may communicate with multiple UE devices in cell 40. FIG. 5 is a diagram showing how base station 8 may handle communications for multiple UE devices in cell 40. Base station (BS) 8 may lie at, near, or adjacent to the center of cell 40. In the example of FIG. 5, there are nine UE devices UE1, UE2, UE3, UE4, UE5, UE6, UE7, UE8, and UE9 within cell 40, UE devices UE1-UE3 lie within region 100 of cell 40 (e.g., extending from base station 8 to radius R1 from base station 8), UE devices UE4-UE6 lie within region 102 of cell 40 (e.g., extending from radius R1 to radius R2 from base station 8), and UE devices UE7-UE9 lie within region 104 of cell 40 (e.g., extending from radius R2 to radius R3 from base station 8). UE devices UE1-UE9 may be devices such as device 10 of FIG. 1. Some of the UE devices may have different capabilities (e.g., different output power level capabilities, different maximum output power levels $P_{CMAX}$, etc.) than the other UE devices in cell 40. The example of FIG. 5 is merely illustrative and, in general, cell 40 may include any number of UE devices (e.g., one UE device, a few UE devices, dozens of UE devices, hundreds of UE devices, thousands of UE devices, etc.) located at any locations within cell 40 and at any distances from base station 8 (e.g., within regions 100, 102, 104, and/or other regions of cell 40).

Base station 8 may communicate with each UE device in cell 40 using the operations of FIG. 3 and optionally the power saving operations of FIG. 4 (without conveying TPC signals between base station 8 and any of the UE devices). There are many challenges for base station 8 in communicating with multiple UE devices in cell 8. For example, if care is not taken, communications between base station 8 and different UE devices can interfere with each other, and the differential path loss PL between all of the UE devices and base station 8 can cause some of the UE devices to interfere in the communications of other UE devices, can cause non-uniform PSD within one or more channels at base station 8, can cause some of the UE devices to exhibit insufficient UL signal SNR at base station 8, etc.

To mitigate these issues, base station 8 may communicate with each of the UE devices in cell 40 using an orthogonal frequency-division multiple access (OFDMA) scheme, a time-division multiple access (TDMA) scheme, or a combination OFDMA/TDMA scheme (e.g., operations 52 of FIG. 3 may be performed using an OFDMA scheme, a TDMA scheme, or a combination OFDMA/TDMA scheme).

When operating under a TDMA scheme, base station 8 may allocate different time slots to each of the UE devices in cell 40 (e.g., by generating communication schedules for each of the UE devices in cell 40). Base station 8 may then communicate with each UE device in its respective time slot (e.g., base station 8 may perform operation 52 of FIG. 3 with UE device UE1 during a first time slot, base station 8 may perform operation 52 of FIG. 3 with UE device UE2 during a second time slot subsequent to the first time slot, base station 8 may perform operation 52 of FIG. 3 with UE device UE3 during a third time slot subsequent to the second time slot, base station 8 may perform operation 52 of FIG. 3 with UE device UE4 during a fourth time slot subsequent to the third time slot, etc.). Each UE device may transmit UL signals at its maximum output power level $P_{CMAX}$ during its respective time slot. The power saving operations of FIG. 4 may be performed for one or more of the UE devices if desired.

It is unlikely that base station 8 would be saturated by UL signals from the UE devices under a TDMA scheme due to high signal attenuation at frequencies greater than or equal to 57 GHz, as only a single UE device transmits UL signals to base station 8 at any given time. Use of a TDMA scheme may also be superior to OFDMA for beam-forming operations, as the signal beam for the base station (e.g., signal beam 44 of FIG. 2) can be steered to align with each UE device during its respective time slot. However, TDMA becomes less efficient as the number of UE devices in the cell increases (e.g., because base station 8 will take longer to provide coverage to any given UE device between time slots).

When operating under an OFDMA scheme, base station 8 may allocate different portions of one or more channels to each of the UE devices in cell 40 (e.g., by generating communication schedules for each of the UE devices in cell 40). An example in which different portions of a single channel is allocated to different UE devices in cell 40 is described herein as an example for the sake of simplicity. The channel may have a corresponding channel bandwidth CBW. Different resources (spectrum) of the channel (e.g., different portions of the corresponding CBW) may be allocated to each of the UE devices. Each of the UE devices may therefore communicate with base station 8 (e.g., using the operations of FIG. 3 and optionally the operations of FIG. 4) concurrently in time.

At the same time, it can be challenging for base station 8 to perform satisfactory OFDMA operations with each UE device in cell 40 without conveying TPC commands. For example, within a given cell of a cellular network, TPC commands are often used to align the UL power spectral density (PSD) at the base station so that the UL signals from all of the UE devices can be properly demodulated without in-channel blocking at the base station. In other words, if the base station communicates with multiple UE devices in its cell within a given channel (e.g., where each UE device is assigned a respective portion of the CBW of the given channel), relatively high variations in the UL signal power across the UE devices (e.g., due to different path losses between base station 8 and each UE device) can cause the base station to lose the ability to properly demodulate all of the UL signals due to in-channel blocking. The base station can transmit TPC commands that increase the output power level of some of the UE devices and/or that decrease the output power level of some of the UE devices to ensure that the power level of the UL signals received from all of the UE devices is relatively uniform at the base station. This serves to align the PSD at the base station across the given channel, thereby ensuring that the UL signals from all of the UE devices can be properly demodulated at the base station. In addition, the use of OFDMA for beam-forming operations may be inefficient unless the base station has separate beam-formers for each UE device, as bandwidth parts (BWPs) from different UE devices may have a different angle of arrival (AoA) at the base station.

Figure 6:
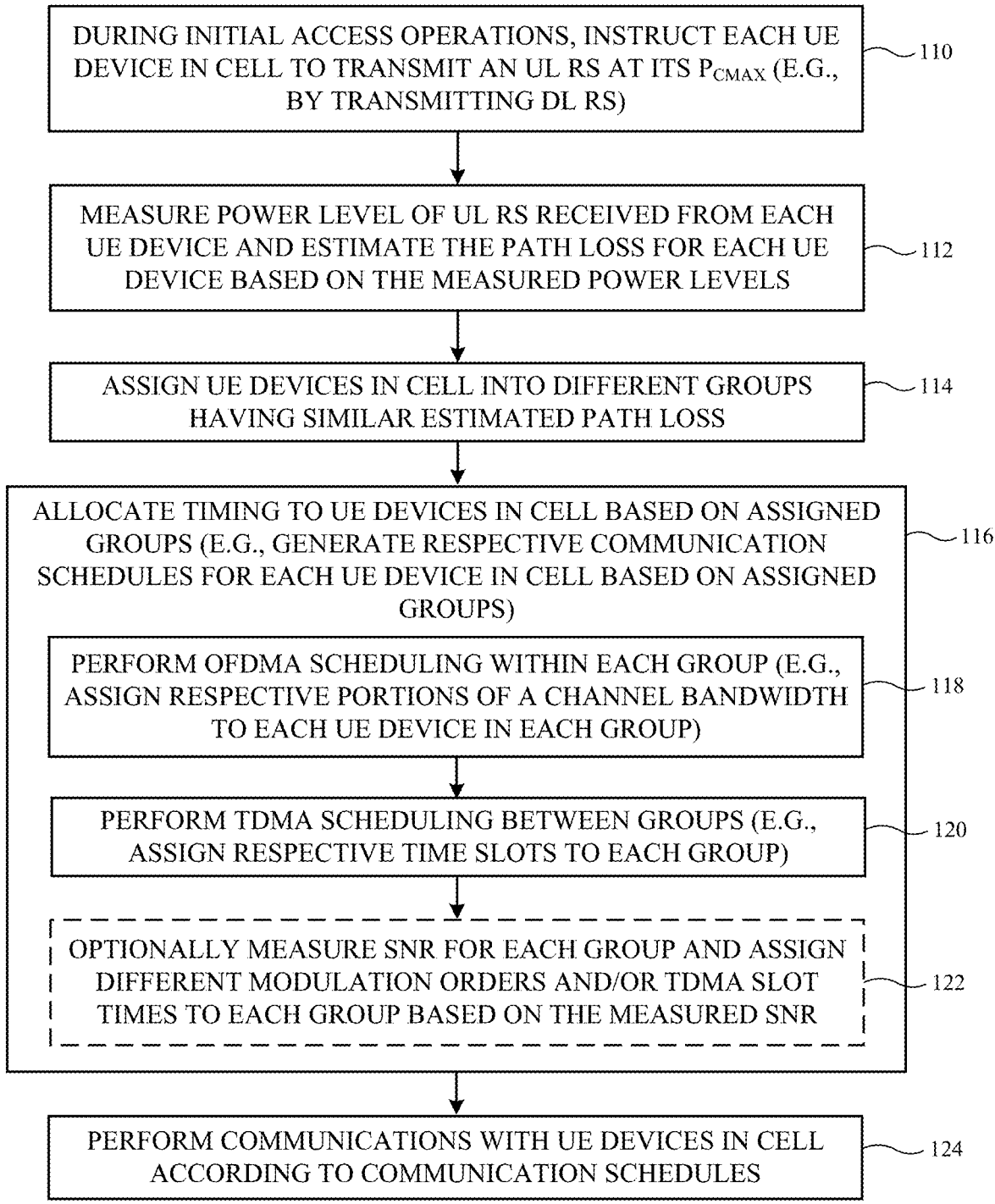
FIG. 6 is a flow chart of illustrative operations that may be performed by a wireless base station to communicate with multiple user equipment devices in a cell without conveying TPC signals and using a combined orthogonal frequency-division multiple access (OFDMA) and time-division multiple access (TDMA) scheme in accordance with some embodiments.

To mitigate these issues while providing network access to multiple UE devices within cell 40, base station 8 may perform communications with the UE devices in its cell using a combined OFDMA/TDMA scheme. FIG. 6 is a flow chart of operations that may be performed by base station 8 to communicate with multiple UE devices in cell 40 using a combined OFDMA/TDMA without transmitting TPC signals. The operations of FIG. 6 are described herein as being performed by base station 8 to communicate with UE devices UE1-UE9 of FIG. 5 for the sake of illustration. This is merely exemplary and, in general, the operations of FIG. 6 may be performed to communicate with any desired number of UE devices at any desired locations in cell 40.

Operation 110 of FIG. 6 may be performed during the initial access operation for the UE devices in cell 40 (e.g., while performing operation 50 of FIG. 3 for UE devices UE1-UE9 of FIG. 5). At operation 110, base station 8 may transmit a downlink signal (e.g., a DL RS) that instructs each of the UE devices in cell 40 (e.g., UE devices UE1-UE9) to transmit an UL signal (e.g., a UL RS) at its respective maximum output power level $P_{CMAX}$.

At operation 112, base station 8 may measure the UL power level of the UL RS transmitted by each of the UE devices in cell 40. Base station 8 may compare the measured UL power level to the nominal transmit power level of the UL RS transmitted by each of the UE devices to estimate the path loss PL for each UE device. The estimated path losses PL for UE devices UE1-UE3 may be less than the estimated path losses PL for UE devices UE4-UE6, which may be less than the estimated path losses PL for UE devices UE7-UE9 (e.g., because UE devices UE1-UE3 are closer to base station 8 than UE devices UE4-UE6, which are closed to base station 8 than UE devices UE7-UE9). UE devices with different maximum output power levels $P_{CMAX}$ may be considered as a factor embedded in the path loss PL (or the distance between each UE device and the base station). In this example, the network would consider all UE devices in the cell as transmitting at the same maximum output power level $P_{CMAX}$.

At operation 114, base station 8 may assign different UE devices into different groups having similar estimated path losses PL (e.g., base station 8 may partition the UE devices into assigned groups based on path losses PL). For example, base station 8 may assign UE devices UE1-UE3 (e.g., UE devices having estimated path losses PL consistent with a UE device within region 100 of cell 40) to a first group G1, may assign UE devices UE4-UE6 (e.g., UE devices having estimated path losses PL consistent with a UE device within region 102 of cell 40) to a second group G2, and may assign UE devices UE7-UE9 (e.g., UE devices having estimated path losses PL consistent with a UE device within region 104 of cell 40) to a third group G3. The estimated path losses for each group may be within a predetermined range or margin from each other (e.g., within 6 dB, 5 dB, 8 dB, 10 dB, 12 dB, 4-12 dB, etc.). Base station 8 may use any desired number of groups defined by any desired path loss range.

At operation 116, base station 8 may allocate (schedule) timing for subsequent communications with each UE device in cell 40 based on the assigned groups (e.g., base station 8 may generation respective communication schedules for each of the UE devices based on the assigned groups). In the example of FIG. 6, the scheduling is performed based on a combined OFDMA/TDMA scheme.

For example, at operation 118, base station 8 may perform OFDMA scheduling within each assigned group. Base station 8 may assign respective portions of the CBW of a selected channel (e.g., at frequencies greater than or equal to 57 GHz) to each UE device in each group. For example, for group G1, base station 8 may assign a first portion of the CBW to UE device UE1, a second portion of the CBW to UE device UE2, and a third portion of the CBW to UE device UE3. For group G2, base station 8 may assign the first portion of the CBW to UE device UE4, the second portion of the CBW to UE device UE5, and the third portion of the CBW to UE device UE6. For group G3, base station 8 may assign the first portion of the CBW to UE device UE7, the second portion of the CBW to UE device UE8, and the third portion of the CBW to UE device UE9.

At operation 120, base station 8 may perform TDMA scheduling between each assigned group. For example, base station 8 may assign a first time slot to group G1, a second time slot subsequent to the first time slot to group G2, and a third time slot subsequent to the second time slot to group G3. Within any given time slot, there may be relatively uniform PSD across the CBW at base station 8 (e.g., because the UE devices in each group by definition have similar estimated path losses PL). This may help to ensure that base station 8 is able to properly decode the UL signals for each of the UE devices in each time slot.

At optional step 122, base station 8 may measure the SNR or other wireless performance metric information from the UL signals transmitted by each group. Optional step 122 may be performed concurrently with operation 112 if desired. Base station 8 may assign different modulation orders (e.g., modulation coding scheme (MCS)) and/or different TDMA time slot durations (slot times) to each group based on the measured SNR (or other wireless performance metric information). Examples of modulation orders that can be used include QPSK, QAM (e.g., 16-QAM, 8-QAM, 64 QAM, etc.), ASK, APSK, or any other desired modulation orders. Changing the modulation order for each group generally changes the number of bits used for a fixed amount of the CBW. If desired, higher-order modulation orders may be assigned to groups having lower path losses (e.g., group G1) and lower-order modulation orders may be assigned to groups having greater path losses (e.g., group G3). Similarly, if desired, longer TDMA time durations (slot times) may be assigned to groups having greater path losses (e.g., group G3) and shorter TDMA time durations may be assigned to groups having lower path losses (e.g., group G1). This may serve to allocate more resources to the UE devices in groups that would otherwise exhibit the worst UL signal SNR at base station 8 to help ensure that satisfactory communications are performed for all of the UE devices in cell 40.

At operation 124, base station 8 may perform subsequent communications with each of the UE devices in cell 40 according to the generated (assigned) communication schedules (e.g., using the timing as allocated during operation 116). These communications may be performed while performing operation 52 of FIG. 3 with each of the UE devices, for example. This may allow base station 8 to provide network access to each of the UE devices even if the UE devices have different communications capabilities, without intra-cell interference between the UE devices, while ensuring uniform UL signal PSD at base station 8, and while mitigating the other challenges of performing OFDMA operations at frequencies greater than or equal to 57 GHz.

Figure 7:
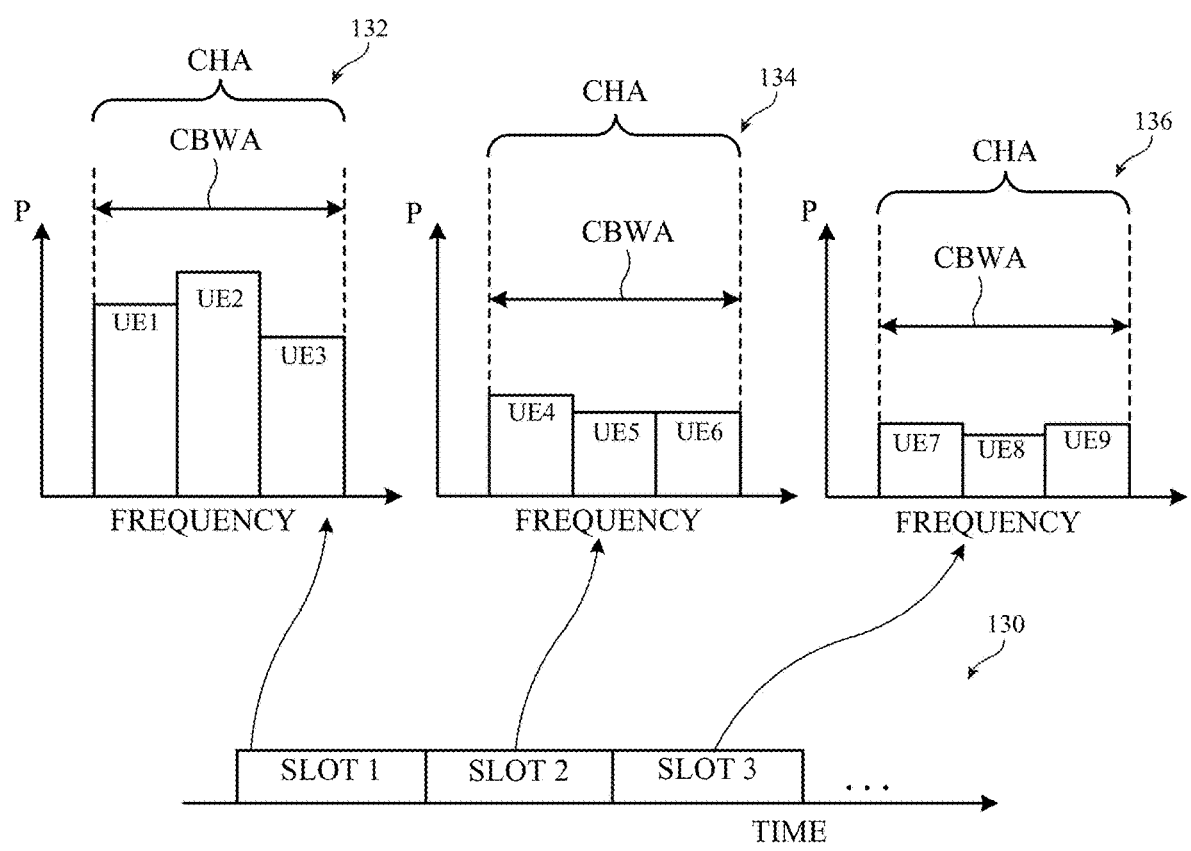
FIG. 7 is a diagram showing how an illustrative wireless base station may schedule communications with multiple user equipment devices without conveying TPC signals and using a combined OFDMA/TDMA scheme in accordance with some embodiments.

FIG. 7 is a diagram showing how base station 8 may schedule communications with UE devices UE1-UE9 (e.g., while performing operation 116 of FIG. 6) without use of TPC signals and using a combined OFDMA/TDMA scheme. As shown in FIG. 7, plots 132, 134, and 136 plot UL power level P (at base station 8) as a function of frequency.

As shown in plot 132, base station 8 may assign the UE devices UE1, UE2, and UE3 from group G1 to respective portions of the channel bandwidth CBWA of channel CHA (e.g., while performing operation 118 of FIG. 118). As shown in plot 134, base station 8 may assign the UE devices UE4, UE5, and UE6 from group G2 to respective portions of the channel bandwidth CBWA of channel CHA (e.g., the same portions of channel bandwidth CBWA as UE devices UE1, UE2, and UE3, respectively, or other portions of the channel bandwidth). Similarly, as shown in plot 136, base station 8 may assign the UE devices UE7, UE8, and UE9 from group G3 to respective portions of the channel bandwidth CBWA of channel CHA (e.g., the same portions of channel bandwidth CBWA as UE devices UE1/UE4, UE2/UE5, and UE3/UE6, respectively, or other portions of the channel bandwidth).

In this example, the UL power level of group G1 (plot 132) is generally greater than the UL power level of group G2 (plot 134), which is generally greater than the UL power level of group G3 (e.g., because group G1 has lower path losses PL than group G2 which has lower path losses PL than group G3). Each of the UE devices in each of the groups transmits UL signals at its respective maximum output power level $P_{CMAX}$, or at a reduced output power level $P_{CMAX}-X$ in scenarios where the power saving operations of FIG. 4 are performed. This example is merely illustrative and, if desired, the groups may be assigned to two or more different channels.

As shown by timing diagram 130 of FIG. 7, base station 8 may assign the UE devices of group G1 to a first time slot SLOT1, may assign the UE devices of group G2 to a second time slot SLOT2, and may assign the UE devices of group G3 to a third time slot SLOT3 (e.g., while performing operation 120 of FIG. 6). Time slots SLOT1-SLOT3 may be, for example, UL time slots. Within each time slot, the UE devices of the corresponding group transmit UL signals to base station 8 using the frequency assignments as shown in plots 132-136.

In scenarios where operation 122 of FIG. 6 is performed, group G1 may be assigned a higher-order modulation order than group G2 and/or group G2 may be assigned a higher-order modulation order than group G3. Additionally or alternatively, time slot SLOT3 may be longer than time slot SLOT2 and/or time slot SLOT2 may be longer than time slot SLOT1. This may allow group G2 and/or group G3 to be provided with additional network resources that help to compensate for the reduced UL power level for these groups relative to group G1. In this way, base station 8 may schedule communications for the assigned groups using an OFDMA scheme within each group and using a TDMA scheme between groups. This may allow for satisfactory wireless communications between base station 8 and each of the UE devices in cell 40 (e.g., with satisfactory PSD) without the need for the transmission of TPC signals.

Figure 8:
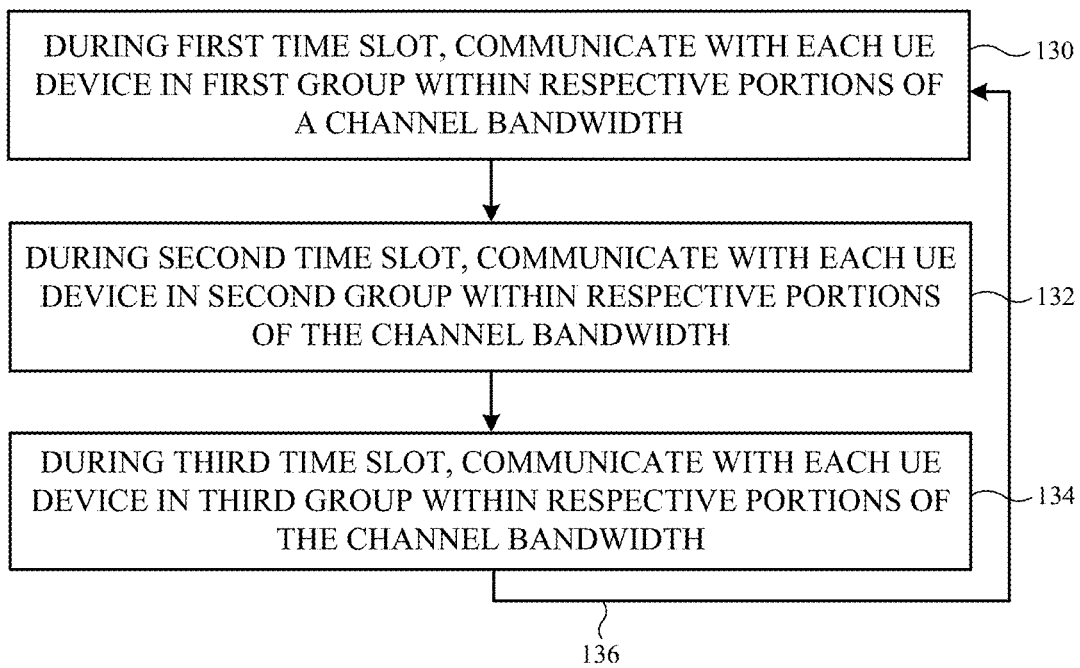
FIG. 8 is a flow chart of illustrative operations that may be performed by a wireless base station to communicate with multiple user equipment devices without conveying TPC signals and using a combined OFDMA/TDMA scheme in accordance with some embodiments.

FIG. 8 is a flow chart of illustrative operations that may be performed by base station 8 in communicating with UE devices UE1-UE9 under the combined OFDMA/TDMA scheme (e.g., while performing operation 124 of FIG. 6 and using the scheduling of FIG. 7).

At operation 130, during time slot SLOT1, base station 8 may receive UL signals from UE device UE1 within the first portion of channel bandwidth CBWA, base station 8 may receive UL signals from UE device UE2 within the second portion of channel bandwidth CBWA, and base station 8 may receive UL signals from UE device UE3 within the third portion of channel bandwidth CBWA.

At operation 132, during time slot SLOT2, base station 8 may receive UL signals from UE device UE4 within the first portion of channel bandwidth CBWA, base station 8 may receive UL signals from UE device UE5 within the second portion of channel bandwidth CBWA, and base station 8 may receive UL signals from UE device UE6 within the third portion of channel bandwidth CBWA.

At operation 134, during time slot SLOT3, base station 8 may receive UL signals from UE device UE7 within the first portion of channel bandwidth CBWA, base station 8 may receive UL signals from UE device UE8 within the second portion of channel bandwidth CBWA, and base station 8 may receive UL signals from UE device UE9 within the third portion of channel bandwidth CBWA. This process may repeat, as shown by arrow 136, as the groups of UE devices continue to transmit UL signals during their respective time slots.

The example of FIGS. 6-8 in which base station 8 generates communication schedules for the UE devices in cell 40 using a combination OFDMA/TDMA scheme is merely illustrative. In another implementation, base station 8 may generate communication schedules for the UE devices in cell 40 using an OFDMA scheme across all of the UE devices in cell 40.

Figure 9:
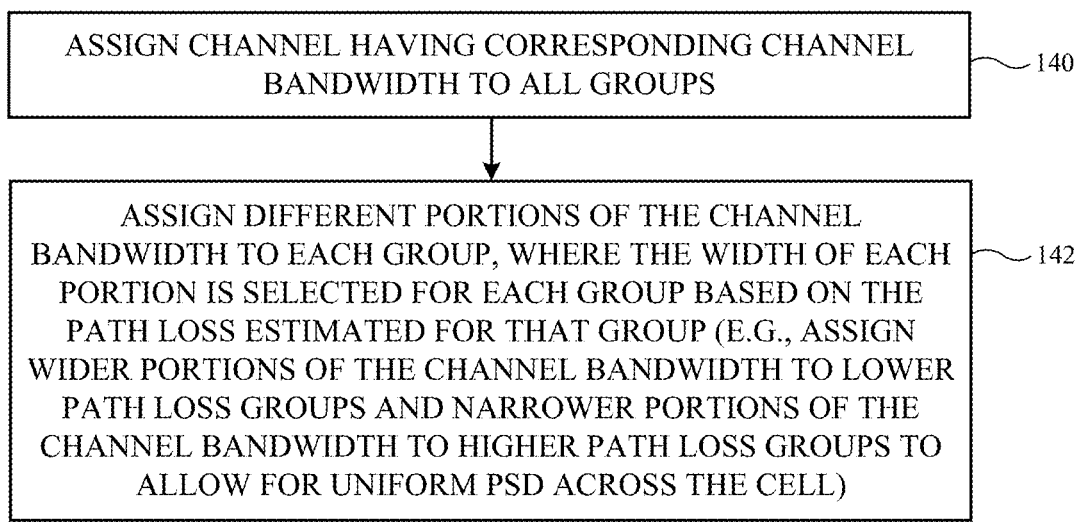
FIG. 9 is a flow chart of illustrative operations that may be performed by a wireless base station to schedule communications for multiple user equipment devices with relatively uniform power spectral density (PSD) under an OFDMA scheme in accordance with some embodiments.

FIG. 9 is a flow chart of operations that may be performed by base station 8 to allocate timing (generate communication schedules) for the UE devices in cell 40 under an OFDMA scheme. Operations 140 and 142 of FIG. 9 may, for example, be performed during operation 116 of FIG. 6 (e.g., instead of operations 118-122 of FIG. 6).

At operation 140 of FIG. 9, base station 8 may assign a channel having a corresponding channel bandwidth to all of the assigned groups of UE devices. For example, base station 8 may assign groups G1, G2, and G3 of the UE devices UE1-UE9 to a channel CHB. Channel CHB may be the same as channel CHA of FIG. 7 or may be different from channel CHA. Channel bandwidth CHB may have a corresponding channel bandwidth CBWB.

At operation 142, base station 8 may assign different respective portions of the channel bandwidth (e.g., channel bandwidth CBWB) to each group. If desired, the width (bandwidth) of each portion of the channel bandwidth may be determined based on the path loss estimated for the corresponding group of UE devices. For example, base station 8 may assign wider portions of the channel bandwidth to groups having lower path losses PL and may assign narrower portions of the channel bandwidth to groups having higher path losses PL. This may help to ensure that base station 8 is provided with a relatively uniform PSD across the channel bandwidth, despite each group being associated with different path losses PL. Different respective subsets of each portion of the channel bandwidth may be assigned to different UE devices within each group.

Figure 10:
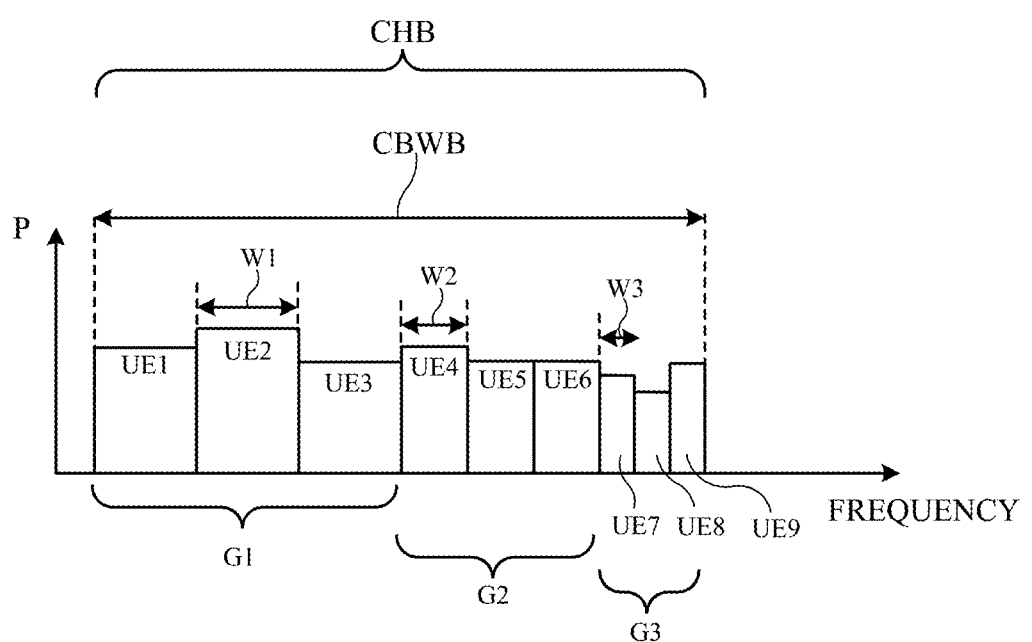
FIG. 10 is a frequency diagram showing how an illustrative wireless base station may schedule communications for multiple user equipment devices with relatively uniform PSD under an OFDMA scheme in accordance with some embodiments.

FIG. 10 is a frequency diagram showing how base station 8 may assign different portions of the channel bandwidth to different groups of UE devices. The frequency diagram of FIG. 10 plots UL power level P (at base station 8) as a function of frequency. As shown in FIG. 10, base station 8 may assign channel CHB having channel bandwidth CBWB to each of the UE devices in cell 40 (e.g., while performing operation 140 of FIG. 9).

Base station 8 may also assign a first portion of channel bandwidth CBWB to group G1, a second portion of channel bandwidth CBWB to group G2, and a third portion of channel bandwidth CBWB to group G3 (e.g., while performing operation 142 of FIG. 9). Base station 8 may allocate more of channel bandwidth CBWB to group G1 than to group G2 and/or may allocate more of channel bandwidth CBWB to group G2 than to group G3 (e.g., because group G1 exhibits lower path losses than group G2 which exhibits lower path losses than group G3). For example, base station 8 may assign each UE device in group G1 to a respective subset of the first portion of channel bandwidth CBWB, where each subset has a bandwidth W1. Base station 8 may assign each UE device in group G2 to a respective subset of the second portion of channel bandwidth CBWB, where each subset has a bandwidth W2 that is less than bandwidth W1. Base station 8 may also assign each UE device in group G3 to a respective subset of the third portion of channel bandwidth CBWB, where each subset has a bandwidth W3 that is less than bandwidth W2. This is merely illustrative and, if desired, different UE devices within each group may be assigned subsets with different bandwidths.

In scenarios where each group is assigned the same bandwidth of channel bandwidth CBWB, there may be a relatively large difference in UL power level P at base station 8 between the groups (e.g., as shown by plots 132-136 of FIG. 7). This UL power non-uniformity may create an excessively non-uniform PSD in channel CHB for base station 8. By allocating a wider portion of channel bandwidth CBWB to group G1 than groups G2 and G3, the overall UL power received at base station 8 from group G1 may be relatively close to the overall UL power received at base station 8 from group G2 (e.g., because the UL power is distributed across a greater range of frequencies for group G1 than for group G2). Similarly, by allocating a wider portion of channel bandwidth CBWB to group G2 than group G3, the overall UL power received at base station 8 from group G2 may be relatively close to the overall UL power received at base station 8 from group G3. This may ensure that there is a relatively uniform PSD at base station 8 across channel bandwidth CBWB, thereby minimizing demodulation errors produced at base station 8 for UE devices UE1-UE9.

The example of FIGS. 9 and 10 is merely illustrative. The order (in frequency) of the allocations of channel bandwidth CBWB to groups G1-G3 may be different. If desired, the OFDMA scheme of FIGS. 9 and 10 may be combined with a TDMA scheme, as described in the flow chart of FIG. 11. Operations 150 and 152 of FIG. 11 may, for example, be performed during operation 116 of FIG. 6 (e.g., instead of operations 118-122 of FIG. 6).

At operation 150, base station 8 may assign at least one UE device from each group to each of a set of time slots. For example, base station 8 may assign UE device UE1 from group G1 to first time slot SLOT1, UE device UE4 from group G2 to first time slot SLOT1, UE device UE7 from group G3 to first time slot SLOT1, UE device UE2 from group G1 to second time slot SLOT2, UE device UE5 from group G2 to second time slot SLOT2, UE device UE8 from group G3 to second time slot SLOT2, UE device UE3 from group G1 to third time slot SLOT3, UE device UE6 from group G2 to third time slot SLOT3, and UE device UE9 from group G3 to third time slot SLOT3.

At operation 152, within each time slot, base station 8 may assign different respective portions of a channel bandwidth to each UE device in the time slot. If desired, the width of each portion of the channel bandwidth (within each time slot) may be determined based on the path loss estimated for the corresponding groups of UE devices. For example, base station 8 may assign wider portions of the channel bandwidth to UE devices from groups having lower path losses PL and may assign narrower portions of the channel bandwidth to UE devices from groups having higher path losses PL. This may help to ensure that base station 8 is provided with a relatively uniform PSD across the channel bandwidth, despite each group being associated with different path losses PL.

Figure 11:
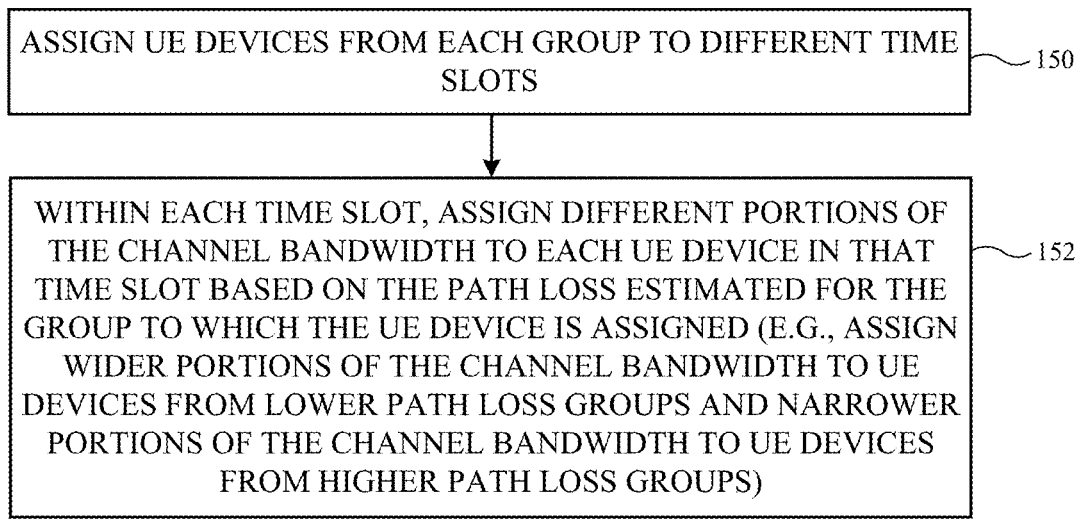
FIG. 11 is a flow chart of illustrative operations that may be performed by a wireless base station to schedule communications for multiple user equipment devices with relatively uniform PSD under a combined OFDMA/TDMA scheme in accordance with some embodiments.
Figure 12:
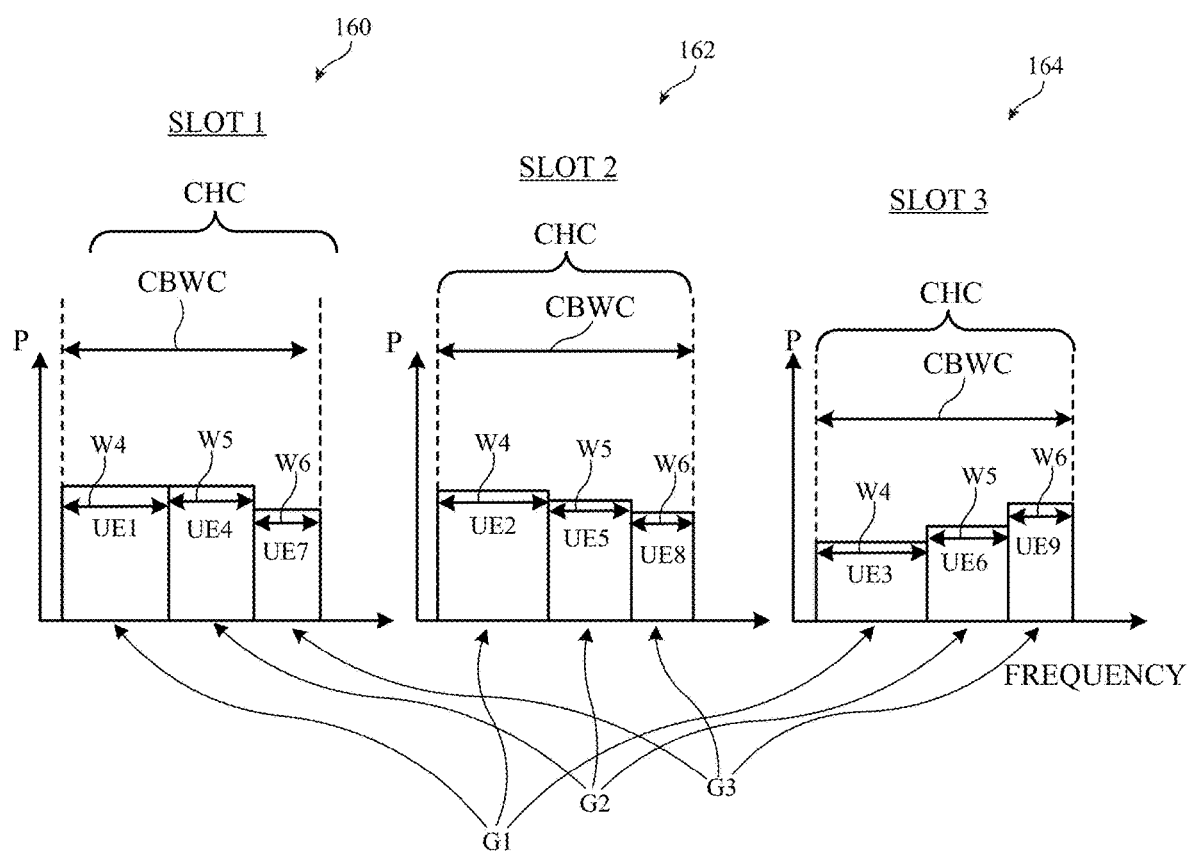
FIG. 12 is a frequency diagram showing how an illustrative wireless base station may schedule communications for multiple user equipment devices with relatively uniform PSD under a combined OFDMA/TDMA scheme in accordance with some embodiments.

FIG. 12 includes frequency diagrams 160, 162, and 164, showing how base station 8 may assign different portions of the channel bandwidth for time slots SLOT1-SLOT3 to UE devices UE1-UE9 (e.g., while performing the operations of FIG. 11). The frequency diagrams of FIG. 12 plot UL power level P (at base station 8) as a function of frequency. As shown in FIG. 10, base station 8 may assign channel CHC having channel bandwidth CBWC to each of the UE devices in cell 40. Channel CHC may be the same as channel CHB of FIG. 10, the same as channel CHA of FIG. 7, or may be different from channels CHA and CHB. Channel bandwidth CBWC may be the same as channel bandwidth CBWB, the same as channel bandwidth CBWA, or may be different from channel bandwidths CBWB and CBWA. The example of FIG. 12 in which the same channel CHC is used in each time slot is merely illustrative and, if desired, different channels may be used for some or all of the time slots.

Plot 160 plots the frequency allocation for first time slot SLOT1. As shown by plot 160, base station 8 may assign UE device UE1 from group G1, UE device UE4 from group G2, and UE device UE7 from group G3 to time slot SLOT1. Base station 8 may allocate respective portions of channel bandwidth CBWC to UE devices UE1, UE4, and UE7. The portion of channel bandwidth CBWC assigned to UE device UE1 may have a first bandwidth W4, the portion of channel bandwidth CBWC assigned to UE device UE4 may have a second bandwidth W5 that is less than first bandwidth W4, and the portion of channel bandwidth CBWC assigned to UE device UE7 may have a third bandwidth W6 that is less than second bandwidth W5 (e.g., because UE device UE1 is from the relatively low path loss group G1, UE device UE4 is from the moderate path loss group G2, and UE device UE7 is from the relatively high path loss group G3). Allocating the frequencies within time slot SLOT1 in this way may serve to minimize variation in the UL power from UE devices UE1, UE4, and UE7 at base station 8, thereby creating a uniform PSD for base station 8 across channel bandwidth CBWC, which allows base station 8 to successfully decode the UL signals from each of the UE devices UE1, UE4, and UE7.

Plot 162 plots the frequency allocation for second time slot SLOT2. As shown by plot 162, base station 8 may assign UE device UE2 from group G1, UE device UE5 from group G2, and UE device UE8 from group G3 to time slot SLOT1. Base station 8 may allocate respective portions of channel bandwidth CBWC to UE devices UE2, UE5, and UE8. The portion of channel bandwidth CBWC assigned to UE device UE2 may have first bandwidth W4, the portion of channel bandwidth CBWC assigned to UE device UE5 may have second bandwidth W5, and the portion of channel bandwidth CBWC assigned to UE device UE8 may have third bandwidth W6 (e.g., because UE device UE2 is from the relatively low path loss group G1, UE device UE5 is from the moderate path loss group G2, and UE device UE8 is from the relatively high path loss group G3). This is merely illustrative and, if desired, the bandwidths allocated for time slot SLOT2 may be different than the bandwidths allocated for time slot SLOT1. Allocating the frequencies within time slot SLOT2 in this way may serve to minimize variation in the UL power from UE devices UE2, UE5, and UE8 at base station 8, thereby creating a uniform PSD for base station 8 across channel bandwidth CBWC, which allows base station 8 to successfully decode the UL signals from each of the UE devices UE2, UE5, and UE8.

Plot 162 plots the frequency allocation for third time slot SLOT3. As shown by plot 164, base station 8 may assign UE device UE3 from group G1, UE device UE6 from group G2, and UE device UE9 from group G3 to time slot SLOT3. Base station 8 may allocate respective portions of channel bandwidth CBWC to UE devices UE3, UE6, and UE9. The portion of channel bandwidth CBWC assigned to UE device UE3 may have first bandwidth W4, the portion of channel bandwidth CBWC assigned to UE device UE6 may have second bandwidth W5, and the portion of channel bandwidth CBWC assigned to UE device UE9 may have third bandwidth W6 (e.g., because UE device UE3 is from the relatively low path loss group G1, UE device UE6 is from the moderate path loss group G2, and UE device UE9 is from the relatively high path loss group G3). This is merely illustrative and, if desired, the bandwidths allocated for time slot SLOT3 may be different than the bandwidths allocated for time slot SLOT1 and/or time slot SLOT2. Allocating the frequencies within time slot SLOT3 in this way may serve to minimize variation in the UL power from UE devices UE3, UE6, and UE9 at base station 8, thereby creating a uniform PSD for base station 8 across channel bandwidth CBWC, which allows base station 8 to successfully decode the UL signals from each of the UE devices UE3, UE4, and UE9.

Figure 13:
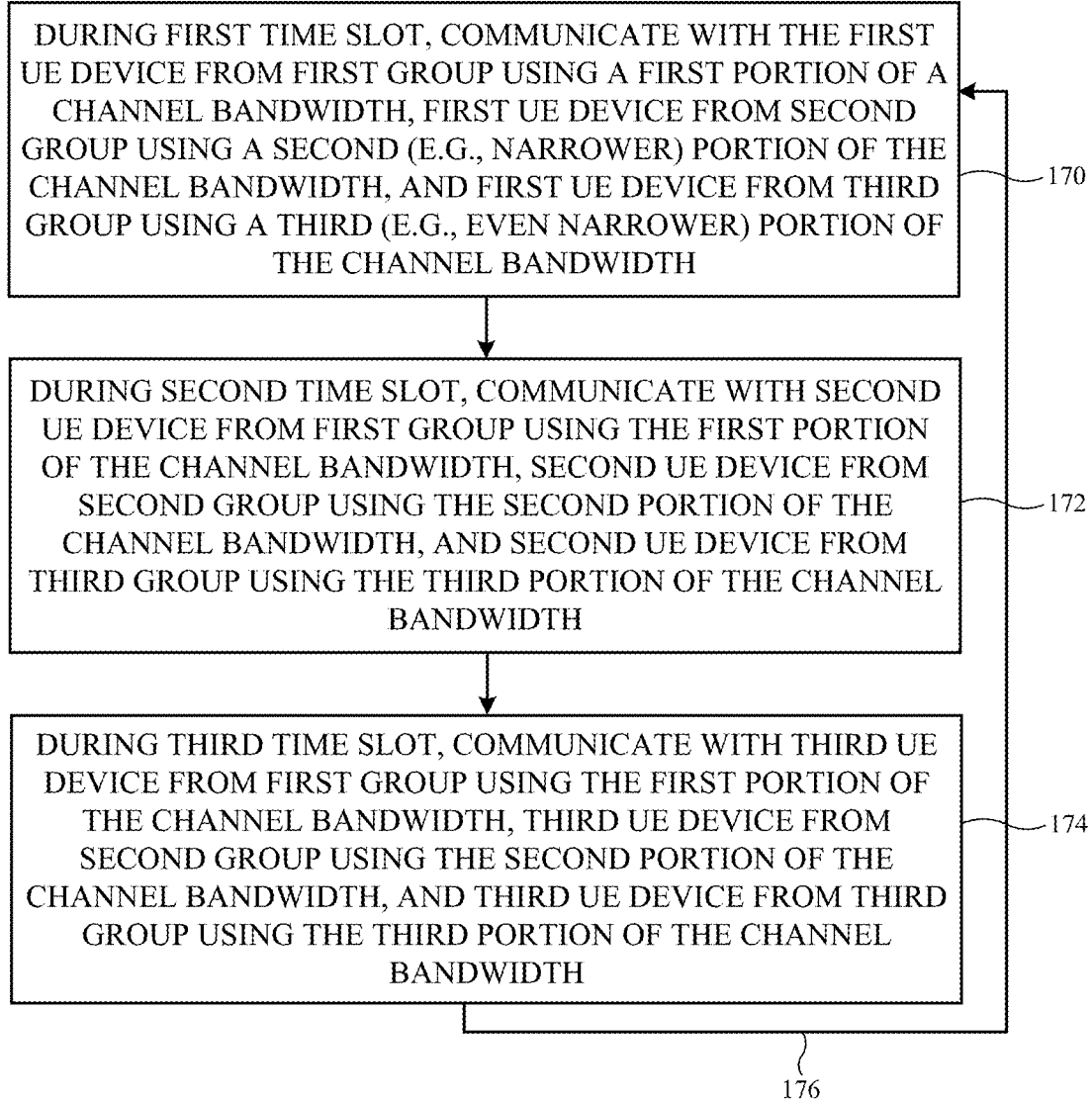
FIG. 13 is a flow chart of illustrative operations that may be performed by a wireless base station to schedule communications for multiple user equipment devices with relatively uniform PSD under a combined OFDMA/TDMA scheme in accordance with some embodiments.

FIG. 13 is a flow chart of illustrative operations that may be performed by base station 8 in communicating with UE devices UE1-UE9 under the combined OFDMA/TDMA scheme of FIGS. 11 and 12 (e.g., while performing operation 124 of FIG. 6 in implementations where operations 118-112 of FIG. 6 are replaced with operations 150-152 of FIG. 11).

At operation 170, during time slot SLOT1, base station 8 may receive UL signals from UE device UE1 within the first portion of channel bandwidth CBWC, base station 8 may receive UL signals from UE device UE4 within the second portion of channel bandwidth CBWC, and base station 8 may receive UL signals from UE device UE7 within the third portion of channel bandwidth CBWC (e.g., as shown by plot 160 of FIG. 12).

At operation 172, during time slot SLOT2, base station 8 may receive UL signals from UE device UE2 within the first portion of channel bandwidth CBWC, base station 8 may receive UL signals from UE device UE5 within the second portion of channel bandwidth CBWC, and base station 8 may receive UL signals from UE device UE8 within the third portion of channel bandwidth CBWC (e.g., as shown by plot 162 of FIG. 12).

At operation 174, during time slot SLOT3, base station 8 may receive UL signals from UE device UE3 within the first portion of channel bandwidth CBWC, base station 8 may receive UL signals from UE device UE6 within the second portion of channel bandwidth CBWC, and base station 8 may receive UL signals from UE device UE9 within the third portion of channel bandwidth CBWC (e.g., as shown by plot 164 of FIG. 12). This process may repeat, as shown by arrow 176, as the UE devices continue to transmit UL signals during their respective time slots.

The examples of FIGS. 5-13 are merely illustrative. In general, there may be any number of UE devices in cell 40. Base station 8 may divide the UE devices into any desired number of assigned groups (e.g., based on the path losses PL estimated for each UE device). Any desired number of time slots, channels, and channel bandwidths may be used under the OFDMA, TDMA, and/or combined OFDMA/TDMA schemes. The channels may span any desired frequencies (e.g., frequencies greater than or equal to 57 GHz).

The methods and operations described above in connection with FIGS. 1-13 may be performed by the components of device 10 and/or base station 8 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 and/or base station 8 (e.g., processing circuitry 22 of FIG. 1, etc.). The processing circuitry may include microprocessors, central processing units (CPUs), application-specific integrated circuits with processing circuitry, or other processing circuitry.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating user equipment to communicate with a wireless base station, the method comprising: with wireless communications circuitry on the user equipment, transmitting first uplink (UL) signals to the wireless base station at a maximum output power level of the wireless communications circuitry, the first UL signals including physical random access channel (PRACH) signals; and with the wireless communications circuitry, transmitting second UL signals to the wireless base station at the maximum output power level subsequent to transmission of the PRACH signals, the first and second UL signals being at one or more frequencies greater than or equal to 57 GHz.

Example 2 includes the method of example 1 or some other example or combination of examples herein, wherein the second UL signals comprise physical uplink shared channel (PUSCH) signals.

Example 3 includes the method of examples 1 or 2 or some other example or combination of examples herein, wherein the second UL signals comprise physical uplink control channel (PUCCH) signals.

Example 4 includes the method of examples 1-3 or some other example or combination of examples herein, wherein the second UL signals comprise sounding reference signals.

Example 5 includes the method of examples 1-4 or some other example or combination of examples herein, further comprising: with the wireless communications circuitry, receiving a downlink (DL) reference signal (RS) from the wireless base station; with the wireless communications circuitry, measuring a signal power of the DL RS; with the wireless communications circuitry, computing a path loss between the user equipment and the wireless base station based on the measured signal power; with the wireless communications circuitry, identifying an output power level reduction based on the computed path loss; and with the wireless communications circuitry, transmitting third UL signals to the wireless base station at an output power level that is less than the maximum output power level by the output power level reduction.

Example 6 includes the method of examples 1-5 or some other example or combination of examples herein, further comprising: with the wireless communications circuitry, receiving a non-transmit power control (non-TPC) downlink (DL) signal from the wireless base station, wherein the non-TPC DL signal identifies an output power level reduction; and with the wireless communications circuitry, transmitting third UL signals to the wireless base station at an output power level that is less than the maximum output power level by the output power level reduction.

Example 7 includes the method of examples 1-6 or some other example or combination of examples herein, wherein the non-TPC DL signal comprises a radio resource command (RRC) DL signal.

Example 8 includes a method of operating a wireless base station within a cell, the method comprising: performing a physical random access channel (PRACH) process with a user equipment (UE) device in the cell at frequencies greater than 57 GHz, wherein the UE device transmits uplink (UL) PRACH signals at its maximum output power level during the PRACH process; and performing connected mode communications with the UE device at one or more frequencies greater than 57 GHz subsequent to the PRACH process, wherein the UE device transmits UL signals at the maximum output power level during the connected mode communications.

Example 9 includes the method of example 8 or some other example or combination of examples herein, further comprising: measuring a signal-to-noise ratio (SNR) of the UL signals; identifying an output power level reduction for the first UE device based on the measured SNR; and transmitting a non-transmit power control (non-TPC) downlink (DL) signal to the UE device that instructs the UE device to transmit additional UL signals at an output power level that is less than the maximum output power level by the output power level reduction.

Example 10 includes the method of examples 8, 9 or some other example or combination of examples herein, wherein the non-TPC DL signal comprises a radio resource control (RRC) DL signal.

Example 11 includes the method of examples 8-10 or some other example or combination of examples herein, further comprising: performing connected mode communications with an additional UE device in the cell at frequencies greater than 57 GHz, wherein the additional UE device transmits UL signals at its maximum output power level during the connected mode communications; and scheduling the connected mode communications with the UE device and the additional UE device using a time-domain multiple access (TDMA) scheme in which the UE device and the additional UE device transmit within respective time slots.

Example 12 includes the method of examples 8-11 or some other example or combination of examples herein, wherein the wireless base station does not convey transmit power control (TPC) signals to the UE device during the PRACH process and the connected mode communications.

Example 13 includes a method of operating a wireless base station within a cell, the method comprising: transmitting a downlink (DL) reference signal (RS) to user equipment (UE) devices in the cell, wherein each of the UE devices has a respective maximum output power level and the DL RS instructs each of the UE devices to transmit a respective uplink (UL) RS at its respective maximum output power level; receiving the UL reference signals and measuring power levels of the received UL reference signals; generating a respective path loss value for each of the UE devices based on the measured power levels of the received UL reference signals; partitioning the UE devices into groups based on the path loss values; generating communication schedules for the UE devices based at least in part on the group to which each UE device is partitioned; and performing communications at frequencies greater than or equal to 57 GHz with the UE devices based on the generated communication schedules.

Example 14 includes the method of example 13 or some other example or combination of examples herein, wherein performing communications at frequencies greater than or equal to 57 GHz comprises performing communications without transmitting transmit power control (TPC) signals to the UE devices.

Example 15 includes the method of examples 13, 14, or some other example or combination of examples herein, wherein each of the groups comprises UE devices that exhibit path loss values within a predetermined margin from each other, wherein generating the communication schedules comprises: performing orthogonal frequency-domain multiple access (OFDMA) scheduling within each of the groups; and performing time-domain multiple access (TDMA) scheduling between the groups, the method further comprising: assigning a first modulation scheme to a first of the groups having first path loss values; and assigning a second modulation scheme to a second of the groups having second path loss values that are greater than the first path loss values, wherein the first modulation scheme is higher order than the second modulation scheme.

Example 16 includes the method of examples 13-15 or some other example or combination of examples herein, wherein partitioning the UE devices into groups comprises partitioning the UE devices into at least first, second, and third groups, wherein the UE devices in the first group have first path loss values, the UE devices in the second group have second path loss values that are greater than the first path loss values, and the UE devices in the third group have third path loss values that are greater than the second path loss values.

Example 17 includes the method of examples 13-16 or some other example or combination of examples herein, wherein generating the communication schedules comprises: assigning each of the UE devices in the first group to respective portions of a channel bandwidth; assigning each of the UE devices in the second group to respective portions of the channel bandwidth; assigning each of the UE devices in the third group to respective portions of the channel bandwidth; assigning the first group to a first time slot; assigning the second group to a second time slot different from the first time slot; and assigning the third group to a third time slot different from the first and second time slots.

Example 18 includes the method of examples 13-17 or some other example or combination of examples herein, wherein generating the communication schedules comprises: assigning a channel having a channel bandwidth to the first, second, and third groups; assigning a first portion of the channel bandwidth to the first group; assigning, to the second group, a second portion of the channel bandwidth that is different from the first portion; assigning, to the third group, a third portion of the channel bandwidth that is different from the first and second portions; assigning a respective subset of the first portion of the channel bandwidth to each UE device in the first group; assigning a respective subset of the second portion of the channel bandwidth to each UE device in the second group; assigning a respective subset of the third portion of the channel bandwidth to each UE device in the third group; allocating a first bandwidth to the first portion of the channel bandwidth; allocating a second bandwidth that is less than the first bandwidth to the second portion of the channel bandwidth; and allocating a third bandwidth that is less than the second bandwidth to the third portion of the channel bandwidth.

Example 19 includes the method of examples 13-18 or some other example or combination of examples herein, wherein generating the communication schedules comprises: assigning a first time slot to a first UE device from the first group, a first UE device from the second group, and a first UE device from the third group; and assigning a second time slot subsequent to the first time slot to a second UE device from the first group, a second UE device from the second group, and a second UE device from the third group, and within the first time slot: assigning a first portion of a channel bandwidth to the first UE device from the first group, wherein the first portion has a first bandwidth; assigning a second portion of the channel bandwidth to the first UE device from the second group, wherein the second portion has a second bandwidth that is less than the first bandwidth; and assigning a third portion of the channel bandwidth to the first UE device from the third group, wherein the third portion has a third bandwidth that is less than the second bandwidth.

Example 20 includes the method of examples 13-19 or some other example or combination of examples herein, wherein generating the communication schedules comprises, within the second time slot: assigning the first portion of the channel bandwidth to the second UE device from the first group; assigning the second portion of the channel bandwidth to the second UE device from the second group; and assigning the third portion of the channel bandwidth to the second UE device from the third group.

Example 21 may include an apparatus comprising means to perform one or more elements of a method described in or related to any of examples 1-20 or any combination thereof, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20 or any combination thereof, or any other method or process described herein.

Example 23 may include an apparatus comprising logic, modules, or circuitry to perform one or more elements of a method described in or related to any of examples 1-20 or any combination thereof, or any other method or process described herein.

Example 24 may include a method, technique, or process as described in or related to any of examples 1-20 or any combination thereof, or portions or parts thereof.

Example 25 may include an apparatus comprising: one or more processors and one or more non-transitory computer-readable storage media comprising instructions that, when executed by the one or more processors, cause the one or more processors to perform the method, techniques, or process as described in or related to any of examples 1-20, or any combination thereof, or portions thereof.

Example 26 may include a signal as described in or related to any of examples 1-20, or any combination thereof, or portions or parts thereof.

Example 27 may include a datagram, information element, packet, frame, segment, PDU, or message as described in or related to any of examples 1-20, or any combination thereof, or portions or parts thereof, or otherwise described in the present disclosure.

Example 28 may include a signal encoded with data as described in or related to any of examples 1-20, or any combination thereof, or portions or parts thereof, or otherwise described in the present disclosure.

Example 29 may include a signal encoded with a datagram, IE, packet, frame, segment, PDU, or message as described in or related to any of examples 1-20, or any combination thereof, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or any combination thereof, or portions thereof.

Example 31 may include a computer program comprising instructions, wherein execution of the program by a processing element is to cause the processing element to carry out the method, techniques, or process as described in or related to any of examples 1-20, or any combination thereof, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made by those skilled in the art without departing from the scope and spirit of the described embodiments. The foregoing embodiments may be implemented individually or in any combination.

What is claimed is:

1. A method of operating user equipment to communicate with a wireless base station, the method comprising:
   transmitting, using wireless communications circuitry on the user equipment, first uplink (UL) signals to the wireless base station at a maximum output power level of the wireless communications circuitry, the first UL signals including physical random access channel (PRACH) signals;
   transmitting, using the wireless communications circuitry, second UL signals to the wireless base station at the maximum output power level subsequent to transmission of the PRACH signals, the first and second UL signals being at one or more frequencies greater than or equal to 57 GHz;
   receiving, using the wireless communications circuitry, a non-transmit power control (non-TPC) downlink (DL) signal from the wireless base station, wherein the non-TPC DL signal comprises a radio resource command (RRC) DL signal and the RRC DL signal includes information specifying an amount of output power level reduction; and
   transmitting, using the wireless communications circuitry, third UL signals to the wireless base station at an output power level that is less than the maximum output power level by the amount of output power level reduction specified by the information in the RRC DL signal.

2. The method of claim 1, wherein the second UL signals comprise physical uplink shared channel (PUSCH) signals.

3. The method of claim 1, wherein the second UL signals comprise physical uplink control channel (PUCCH) signals.

4. The method of claim 1, wherein the second UL signals comprise sounding reference signals.

5. The method of claim 1, further comprising:
   with the wireless communications circuitry, receiving a downlink (DL) reference signal (RS) from the wireless base station;
   with the wireless communications circuitry, measuring a signal power of the DL RS;
   with the wireless communications circuitry, computing a path loss between the user equipment and the wireless base station based on the measured signal power;
   with the wireless communications circuitry, identifying an output power level reduction based on the computed path loss; and
   with the wireless communications circuitry, transmitting third UL signals to the wireless base station at an output power level that is less than the maximum output power level by the output power level reduction.

6. The method of claim 1, further comprising:
   communicating, using the wireless communications circuitry, with the wireless base station according to a communications schedule for the user equipment, wherein
      the communications schedule is generated by a network associated with the wireless base station based on a partitioning of the user equipment into a group from a plurality of groups of UE devices, the partitioning is performed by the network based on a path loss value of the user equipment, and the network generates the path loss value based on a power level of the PRACH signals measured by the wireless base station.

7. A method of operating a wireless base station within a cell, the method comprising:

performing a physical random access channel (PRACH) process with a user equipment (UE) device in the cell at frequencies greater than 57 GHz, wherein the UE device transmits uplink (UL) PRACH signals at its maximum output power level during the PRACH process;

performing connected mode communications with the UE device at one or more frequencies greater than 57 GHz subsequent to the PRACH process, wherein the UE device transmits first UL signals at the maximum output power level during the connected mode communications;

transmitting a non-transmit power control (non-TPC) downlink (DL) signal, wherein the non-TPC DL signal comprises a radio resource command (RRC) DL signal and the RRC DL signal includes information specifying an amount of output power level reduction; and receiving, from the UE device, second UL signals at an output power level that is less than the maximum output power level by the amount of output power level reduction specified by the information in the RRC DL signal.

8. The method of claim 7, further comprising:
measuring a signal-to-noise ratio (SNR) of the UL signals; and
identifying the output power level reduction for the UE device based on the measured SNR.

9. The method of claim 7, further comprising:
performing connected mode communications with an additional UE device in the cell at frequencies greater than 57 GHZ, wherein the additional UE device transmits UL signals at its maximum output power level during the connected mode communications; and
scheduling the connected mode communications with the UE device and the additional UE device using a time-domain multiple access (TDMA) scheme in which the UE device and the additional UE device transmit within respective time slots.

10. The method of claim 9, wherein the wireless base station does not convey transmit power control (TPC) signals to the UE device during the PRACH process and the connected mode communications.

11. The method of claim 7, further comprising:
measuring a power level of the UL PRACH signals transmitted by the UE device;
generating a path loss value for the UE device based on the measured power level;
partitioning the UE device into a group of a plurality of groups of UE devices based on the path loss value;
generating a communications schedule for the UE device based at least in part on the partitioning; and
performing the connected mode communications with the UE device based on the communications schedule.

12. The method of claim 7, further comprising:
partitioning the UE device into a group from a plurality of groups of UE devices based on a path loss of the UE device, each group in the plurality of groups being associated with a different respective range of path losses;

generating a communications schedule for the UE device based at least in part on the partitioning; and
performing the connected mode communications with the UE device according to the communications schedule.

13. A method of operating a wireless base station within a cell, the method comprising:

transmitting a downlink (DL) reference signal (RS) to a plurality of user equipment (UE) devices in the cell, wherein the plurality of UE devices have respective maximum output power levels and the DL RS instructs the plurality of UE devices to transmit respective uplink (UL) reference signals at the respective maximum output power levels;

receiving the UL reference signals and measuring power levels of the received UL reference signals;

generating a respective path loss value for the plurality of UE devices based on the measured power levels of the received UL reference signals;

partitioning the plurality of UE devices into at least two groups based on the path loss values;

generating communication schedules for the plurality of UE devices based at least in part on the partitioning; and performing communications at frequencies greater than or equal to 57 GHz with the plurality of UE devices based on the generated communication schedules.

14. The method of claim 13, wherein performing communications at frequencies greater than or equal to 57 GHz comprises performing communications without transmitting transmit power control (TPC) signals to the plurality of UE devices.

15. The method of claim 13, wherein the at least two groups comprise UE devices that exhibit path loss values within a predetermined margin from each other and generating the communication schedules comprises:

performing orthogonal frequency-domain multiple access (OFDMA) scheduling within the at least two groups; and performing time-domain multiple access (TDMA) scheduling between the at least two groups, the method further comprising:

assigning a first modulation scheme to a first of the at least two groups having first path loss values; and assigning a second modulation scheme to a second of the at least two groups having second path loss values that are greater than the first path loss values, wherein the first modulation scheme is higher order than the second modulation scheme.

16. The method of claim 13, wherein partitioning the plurality of UE devices into the at least two groups comprises partitioning the plurality of UE devices into at least first, second, and third groups, UE devices in the first group have first path loss values, UE devices in the second group have second path loss values that are greater than the first path loss values, and UE devices in the third group have third path loss values that are greater than the second path loss values.

17. The method of claim 16, wherein generating the communication schedules comprises:

assigning the UE devices in the first group to respective portions of a channel bandwidth;

assigning the UE devices in the second group to respective portions of the channel bandwidth;

assigning the UE devices in the third group to respective portions of the channel bandwidth;

assigning the first group to a first time slot;

assigning the second group to a second time slot different from the first time slot; and assigning the third group to a third time slot different from the first and second time slots.

18. The method of claim 16, wherein generating the communication schedules comprises:

assigning a channel having a channel bandwidth to the first, second, and third groups;

assigning a first portion of the channel bandwidth to the first group;

assigning, to the second group, a second portion of the channel bandwidth that is different from the first portion;

assigning, to the third group, a third portion of the channel bandwidth that is different from the first and second portions;

assigning a respective subset of the first portion of the channel bandwidth to the UE devices in the first group;

assigning a respective subset of the second portion of the channel bandwidth to the UE devices in the second group;

assigning a respective subset of the third portion of the channel bandwidth to the UE devices in the third group;

allocating a first bandwidth to the first portion of the channel bandwidth;

allocating a second bandwidth that is less than the first bandwidth to the second portion of the channel bandwidth; and allocating a third bandwidth that is less than the second bandwidth to the third portion of the channel bandwidth.

19. The method of claim 16, wherein generating the communication schedules comprises:

assigning a first time slot to a first UE device from the first group, a first UE device from the second group, and a first UE device from the third group; and assigning a second time slot subsequent to the first time slot to a second UE device from the first group, a second UE device from the second group, and a second UE device from the third group, and within the first time slot:

assigning a first portion of a channel bandwidth to the first UE device from the first group, wherein the first portion has a first bandwidth;

assigning a second portion of the channel bandwidth to the first UE device from the second group, wherein the second portion has a second bandwidth that is less than the first bandwidth; and assigning a third portion of the channel bandwidth to the first UE device from the third group, wherein the third portion has a third bandwidth that is less than the second bandwidth, wherein generating the communication schedules comprises, within the second time slot:

assigning the first portion of the channel bandwidth to the second UE device from the first group;

assigning the second portion of the channel bandwidth to the second UE device from the second group; and assigning the third portion of the channel bandwidth to the second UE device from the third group.

20. The method of claim 13, further comprising:

performing orthogonal frequency-domain multiple access (OFDMA) scheduling within the at least two groups; and performing time-domain multiple access (TDMA) scheduling between the at least two groups.

* * * * *